US012236253B2

(12) United States Patent
Potter et al.

(10) Patent No.: US 12,236,253 B2
(45) Date of Patent: Feb. 25, 2025

(54) CREATION AND PRESENTATION OF ACCESSIBLE TARGETED PROMPTS

(71) Applicant: salesforce.com, inc., San Francisco, CA (US)

(72) Inventors: Tracy Potter, Somerset, MA (US); Nithyanandniranjan Chandarraj, Fremont, CA (US); Timothy Dubois, Moss Beach, CA (US); Cordelia McGee-Tubb, San Francisco, CA (US); Lee White, Oakland, CA (US)

(73) Assignee: Salesforce, Inc., San Francisco, CA (US)

( * ) Notice: Subject to any disclaimer, the term of this patent is extended or adjusted under 35 U.S.C. 154(b) by 3 days.

(21) Appl. No.: 17/456,764

(22) Filed: Nov. 29, 2021

(65) Prior Publication Data
US 2022/0391234 A1    Dec. 8, 2022

Related U.S. Application Data

(60) Provisional application No. 63/202,277, filed on Jun. 3, 2021.

(51) Int. Cl.
G06F 3/00        (2006.01)
G06F 3/0482     (2013.01)
(Continued)

(52) U.S. Cl.
CPC ............ *G06F 9/453* (2018.02); *G06F 3/0482* (2013.01); *G06F 3/0486* (2013.01); *G06F 3/04895* (2013.01); *G06F 2203/04803* (2013.01)

(58) Field of Classification Search
CPC ...... G06F 9/453; G06F 3/0482; G06F 3/0486; G06F 3/04895; G06F 2203/04803
See application file for complete search history.

(56) References Cited

U.S. PATENT DOCUMENTS 5,577,188 A    11/1996  Zhu
5,608,872 A     3/1997  Schwartz et al.
(Continued)

OTHER PUBLICATIONS

U.S. Appl. No. 17/452,456, filed Oct. 27, 2021, Spadea, et al.
(Continued)

*Primary Examiner* — Brett A Feeney
*Assistant Examiner* — Andrew Chung
(74) *Attorney, Agent, or Firm* — Weaver Austin Villeneuve & Sampson LLP

(57) ABSTRACT

Methods and corresponding systems and apparatuses for using keyboard input to configure targeted prompts in association with graphical elements of a software application being developed and to access the targeted prompts during runtime execution of the software application. A user interface of a builder application can include a first region and a second region. The first region displays options for configuring targeted prompts. The second region is a canvas region that displays a second user interface generated through execution of the software application. Keyboard input can include a shortcut that updates the user interface to switch between the first region and the second region and/or a shortcut that sequentially navigates between graphical elements that can be associated with targeted prompts. Other keyboard shortcuts can be made available for use with the builder application and/or during runtime execution of the software application.

20 Claims, 14 Drawing Sheets

(51) Int. Cl.
  *G06F 3/0486*    (2013.01)
  *G06F 3/04895*   (2022.01)
  *G06F 9/451*     (2018.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,216,298 B1 * | 5/2007 | Ballard ............... G06F 16/9577 715/744 |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,198,494 B2 | 2/2019 | Hausler et al. |
| 10,430,765 B2 | 10/2019 | Hausler et al. |
| 10,884,574 B1 * | 1/2021 | Rueter ............... G06F 16/9038 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |

(56) References Cited

U.S. PATENT DOCUMENTS

| | | |
|---|---|---|
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0064022 A1* | 3/2009 | Sakamoto ............... G06F 3/048 715/767 |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0242692 A1* | 9/2012 | Laubach ............... G06F 3/04883 345/629 |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0082517 A1* | 3/2014 | Vasudev ............... G06F 3/0489 715/747 |
| 2014/0250392 A1* | 9/2014 | Riggins ............. H04N 21/8545 715/764 |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0067596 A1* | 3/2015 | Brown ................ G06F 3/04812 715/808 |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |
| 2018/0285063 A1* | 10/2018 | Huynh ................. G06F 9/451 |
| 2022/0319219 A1* | 10/2022 | Tsibulevskiy ......... G06F 3/0484 |

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

* cited by examiner

Global

| Keyboard Help | Shift + / |
| Switch focus to the canvas | Cmd + F6 |

Canvas

| Switch focus to the builder | Cmd + F7 |
| Select the next element in the canvas | Cmd + Option (Alt) + t |
| Select the previous element in the canvas | Cmd + Option (Alt) + Shift + t |
| Add a targeted prompt to the selected element | Cmd + Option (Alt) + a |

FIG. 4

CREATION AND PRESENTATION OF ACCESSIBLE TARGETED PROMPTS

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to prompts displayed on a user interface of a software application and more specifically relates to techniques for creating and accessing targeted prompts through a user interface.

BACKGROUND

User interaction with a software application may involve one or more types of input devices such as a keyboard, a computer mouse, a touchscreen, and/or the like. In many instances, a software application is configured to present a user interface (UI) for interacting with a user through an input device. The UI can be a graphical user interface (GUI) displaying graphical elements that the user can interact with. The UI may also display graphical elements corresponding to content generated by the software application for presentation to the user. Over the course of execution, the software application may display graphical elements at various times and according to different layouts, e.g., elements arranged on separate pages or windows, where each page or window includes its own set of one or more graphical elements. In some instances, a software application may present a prompt containing a message to the user. One example of a prompt is a pop-up window that appears when a trigger condition is met. The trigger condition can be based on a user action or an event.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to implementations by one skilled in the art without departing from the spirit and scope of the disclosure.

FIG. 4 shows an example list of keyboard shortcuts that may be available through a builder application, according to some implementations.

DETAILED DESCRIPTION

Figure 1:
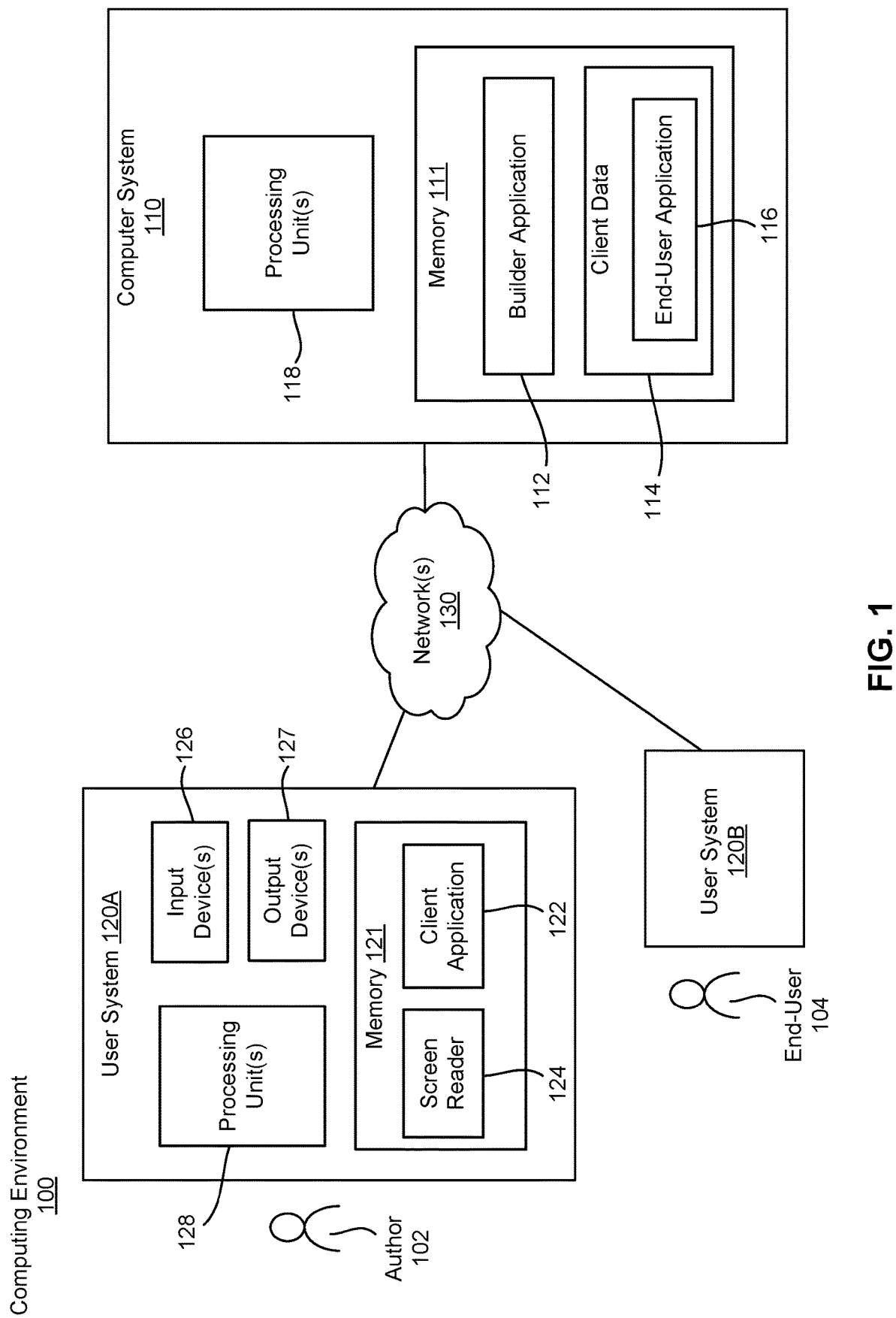
FIG. 1 is a diagram of an example computing environment incorporating one or more implementations.

Examples of systems, apparatus, and methods for configuring and accessing targeted prompts are described herein with reference to certain implementations. These examples are being provided solely to add context and aid in the understanding of the present disclosure. It will thus be apparent to one skilled in the art that the techniques described herein may be practiced without some or all of these specific details. In other instances, well known process operations have not been described in detail in order to avoid unnecessarily obscuring the present disclosure. Other applications are possible, such that the following examples should not be taken as definitive or limiting either in scope or setting.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more examples may be implemented in numerous ways, including as a process, an apparatus, a system, a device, a method, a computer-readable medium such as a non-transitory computer-readable storage medium containing computer-readable instructions or computer program code, or as a computer program product comprising a computer-usable medium having computer-readable program code embodied therein.

A software application can generate prompts relating to other content generated by the software application for display to a user. For instance, a software application may be configured with a walkthrough or tutorial relating to some functionality provided by the software application. A prompt can include a message or information to be presented to the user. Typically, a walkthrough/tutorial includes a sequence of prompts that can be displayed in a specific order. In some instances, a prompt may request that the user perform an action such as specifying a value for a parameter. Depending on the configuration of the software application, prompts may be displayed on-demand, in response to user actions, or in response to in-application or external events. For instance, the UI may include a help menu or other selectable option for accessing a walkthrough. An example of an automated prompt could be a prompt displaying a welcome message in response to the software application determining that the user is accessing some feature for the first time or having trouble accessing the feature. Accordingly, prompts can be displayed in response to an explicit request from an end-user or in response to a rule or set of one or more conditions being satisfied.

A targeted prompt is a type of prompt that points to a graphical element that the targeted prompt is associated with. Targeted prompts are useful for bringing the user's attention to graphical elements. Other types of prompts include floating prompts and docked prompts. Unlike targeted prompts, floating and docked prompts do not point to graphical elements and are generally not associated with any graphical elements. For example, a floating or docked prompt may simply be a prompt placed in a certain screen position (e.g., a location specified in terms of pixel coordinates) without reference to any graphical elements. Different types of prompts can be used in different situations. For instance, a floating prompt may be used to deliver a short message and/or request for the user to perform an action. Since the floating prompt does not point to a graphical element, the user's attention tends to be on the message/ request contained in the floating prompt. A docked prompt (e.g., a prompt tied to a corner of a display screen) is useful for avoiding crowding of the screen, for example, to provide room for inserting a video or a step-by-step tutorial formed using prompts.

Targeted prompts can be challenging to create for authors (e.g., software developers) who are visually impaired. A targeted prompt can be created through a separate builder application that enables an author to configure the look and feel of a software application being developed. Using the builder application, the author may arrange graphical elements according to a predefined or custom layout. In order to make the builder application accessible to visually impaired authors, aspects of the present disclosure are directed to techniques for enabling an author to easily navigate through various options associated with the creation of a targeted prompt. Aspects also relate to techniques for configuring a UI of a builder application to indicate to an author what elements are selectable for targeting and which element a targeted prompt is associated with, even if the author is visually impaired.

Targeted prompts can also be challenging from the perspective of an end-user. The end-user is typically a user of a computing device on which the software application is installed after development has been completed. In some instances, an end-user may be a beta tester or other user with access prior to general release of the software application. In general, a visually impaired user, whether end-user or author, should be able to understand what a targeted prompt is about and what the targeted prompt is pointing to. This is less of a concern when the associated element has a label (e.g., the element is a button with descriptive text), but not all elements have labels. In some instances, a visually impaired user may find it difficult to understand what a targeted prompt is pointing to, for example, because the targeted prompt may not be in an optimal position relative to the element that the targeted point is associated with, or because the element is difficult to distinguish from other elements on the page. Additionally, a visually impaired user may benefit from being able to, during the development phase or at runtime, navigate through targeted prompts and their associated elements without necessarily relying on a pointing device, since pointing precision may be limited due to lack of visual acuity. Accordingly, aspects of the present disclosure relate to keyboard-based options for engaging in functionality relating to targeted prompts, both when a software application is being developed and when the software application is deployed for execution on a computing device of an end-user.

Example implementations are described in connection with the use of keyboard shortcuts. A keyboard shortcut can be a specific combination of keys pressed or activated with a certain timing, e.g., in sequence and/or simultaneously. In some instances, a keyboard shortcut may involve pressing or activating a single key, e.g., holding down a key for a certain duration. In general, a keyboard is an input device with physical keys arranged according to a standard layout such as QWERTY. However, keyboards can also encompass software-based keyboards that are displayed on-screen, e.g., on a touchscreen. In some instances, keyboards may be virtual keyboards that are projected onto a physical surface using, for example, a laser. Accordingly, it will be understood that the example implementations are not restricted to physical keyboards.

FIG. 1 is a diagram of an example computing environment 100 incorporating one or more implementations. The environment 100 includes a computer system 110 and user systems 120A and 120B. Each of the user systems 120A, 120B is a computer system that includes a computing device (e.g., a laptop, a desktop, a smartphone, a tablet, etc.). The user system 120A is operated by a first user (an author 102). The user system 120B is operated by a second user 104 (an end-user 104). The user system 120A and the user system 120B may each include components of a general-purpose computer. Accordingly, the discussion of the components which form the user system 120A generally applies to the user system 120B. FIG. 1 is merely an example with a single author and a single end-user. In practice, an application is often the product of contributions from multiple authors and used by multiple end-users.

As shown in FIG. 1, the computer system 110 is communicatively coupled to the user systems 120A, 120B through one or more networks 130. The network(s) 130 may include one or more wireless networks, one or more wireline networks, or a combination of wired and wireless networks. For example, a network 130 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

When implemented using a TCP/IP network, the network(s) 130 may support the execution of a web-based builder application 112 by the computer system 110 on behalf of the user system 120A and based on input from author 102. Accordingly, computer system 110 may include a memory 111 storing the builder application 112. The computer system 110 may be configured to provide access to the builder application 112 through a Software as a Service (SaaS) model, a Platform as a Service (PaaS) model, or other cloud computing model. In some implementations, the builder application 112 may be a local application that is installed on the user system 120A. Accordingly, the builder application 112 could be executed by one or more processing units of the user system 120A rather than the processing unit(s) 118 of the computer system 110.

Memory 111 may include storage for client data 114. The client data 114 may include, for example, source code or other types of files corresponding to an application being developed by a particular tenant of the computer system 110 (e.g., an end-user application 116). Computer system 110 may host multiple tenants, in which case the memory 111 may provide tenant-specific storage areas, with access to a storage area being restricted to authorized users (e.g., author 102) of a corresponding tenant. Memory 111 can be formed by one or more memory devices, including non-volatile storage devices (e.g., read-only memory (ROM) or flash memory), volatile storage devices (e.g., random access memory (RAM)), or a combination of volatile and non-volatile memory. Memory can be distributed across memory devices that are not collocated. For example, builder application 112 and client data 114 may reside on servers in different data centers.

Computer system 110 may further include one or more processing units 118 such as a Central Processing Unit (CPU) or microprocessor. Processing units 118 may also include special purpose processors such as a graphics processing units (GPU). The one or more processing units 118 may be configured to execute the builder application 112 using input from one or more authors such as author 102.

User system 120A may include one or more processing units 128. Similar to the processing units 118, the one or more processing units 128 may include at least one general purpose processor such as a CPU, possibly in combination with one or more special purpose processors such as a GPU.

Author 102 may use the builder application 112 to configure the end-user application 116. The builder application 112 can be accessed through a client application 122 installed on user system 120A. The client application 122 may reside in memory 121 of the user system 120 and can be a web browser or thin-client program configured to communicate with the builder application 112 through an application-program interface (API). The memory 121 can be implemented in a similar manner to the memory 111 and may also store a screen reader 124.

Builder application 112 may provide options for configuring prompts to be presented by the end-user application 116, e.g., in connection with providing in-application guidance to an end-user. In some implementations, builder application 112 may be an all-inclusive software development tool comprising a source code editor, a compiler, a debugger, and/or the like. In other implementations, the builder application 112 may be part of a suite of software development programs that are collectively used to develop the end-user application 116. In such implementations, the builder application 112 may provide the author 102 with the ability to configure prompts without also providing the ability to edit the source code of the end-user application 116.

The user system 120A can include one or more input devices 126 and one or more output devices 127 for interacting with the author 102. Input devices 126 include, but are not limited to, keyboards, computer mice, trackballs, touchscreens, touchpads, microphones, cameras, and/or the like. Output devices 127 may include a display monitor, an image projector, a loudspeaker, an earbud, an audio headset, a motor that vibrates to provide haptic feedback, and/or the like. In some cases, such as with a touchscreen, an input device may also serve as an output device.

Screen reader 124 is an application configured to render content displayed on a display screen of the user system 120A into speech or braille for output by an output device (e.g., one or more of the output devices 127). The content rendered by the screen reader can include text and/or images. The screen reader 124 may include a text-to-speech converter for converting on-screen text to speech, thus reading aloud the text being presented on the display screen. In some instances, the text converted by screen reader 124 may not be displayed on-screen. For example, the screen reader 124 may receive text describing a graphical element generated by the builder application 112 or the end-user application 116. The screen reader 124 may convert the received text into a corresponding audio description of the graphical element, thereby helping the author 102 understand what the graphical element is about. Screen reader programs are helpful to visually impaired users who have difficulty seeing displayed content. For some users, operation of a computer system is impossible without the aid of a screen reader. In the context of computing environment 100, the screen reader 124 may be used to assist the author 102 in understanding content associated with the builder application 112, including UI elements that can be used to create or configure prompts. The screen reader 124 can be executed concurrently with the builder application 112 to supplement accessibility features provided by the builder application 112.

User system 120B and other user systems within the computing environment 100 may be configured similarly to the user system 120A. User system 120B may, for instance, include one or more processing units, one or more input devices, one or more output devices, and memory storing applications executable by the user system 120B. The applications stored in the memory of the user system 120B may include a screen reader and a client application. The client application may, similar to the client application 122, be a web browser or other thin-client configured to communicate with a remotely executed application. In some implementations, the client application residing in the user system 120B may be used to access the end-user application 116. Alternatively, the end-user application 116 may be a local application that is installed on the user system 120B. A screen reader of the user system 120B may assist the end-user 104 with navigating through display content generated by the end-user application 116. For instance, the end-user 104 may use a screen reader to render prompts and other graphical elements into speech while the end-user 104 is interacting with the end-user application 116.

Figure 2:
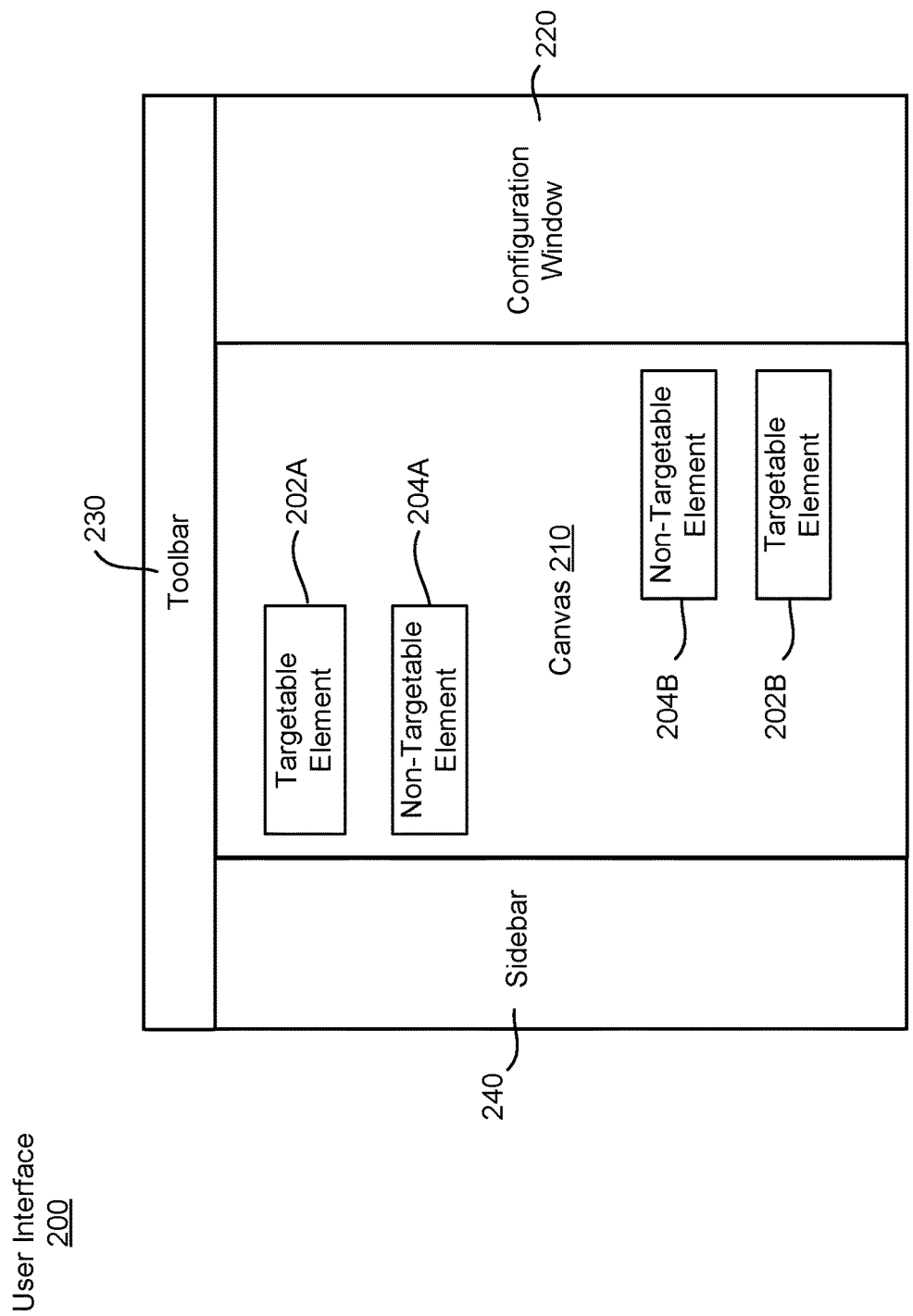
FIG. 2 is a simplified representation of a user interface of a builder application, according to some implementations.

FIG. 2 is a simplified representation of a UI 200 of a builder application (e.g., builder application 112), according to some implementations. The UI 200 can be presented on a display screen of a user working on an end-user application, e.g., a display monitor of the user system 120A in FIG. 1. The UI 200 is divided into multiple regions, including a first region corresponding to a canvas 210, and a second region corresponding to a configuration window 220. The UI 200 may also include a toolbar 230 and/or a sidebar 240. The sizes of the regions may be adjustable. For example, the author 102 may choose to have a larger (e.g., longer and/or wider) canvas 210 at the expense of a smaller configuration window 220. Accordingly, the builder application may provide the ability to specify the size of one or more regions within the UI 200, for example, through a drag-to-resize operation.

The canvas 210 is configured to present a UI generated by the end-user application (e.g., end-user application 116). The builder application may provide a platform within which the end-user application is executed. Alternatively, the builder application and the end-user application may be executed concurrently under a shared platform. The builder application may load multiple end-user applications concurrently, and the UI of the builder application may allow the user to switch from one end-user application to another end-user application, with appropriate updating of the canvas and without exiting the builder application.

The user/author can interact with the end-user application through the UI of the builder application in a similar manner as an end-user. However, certain functionality available in the builder application may not be available in the end-user application. For instance, because an author is generally free to configure the graphical elements generated by the end-user application, the author may select a graphical element using a pointing device (e.g., a point-and-click operation or, as discussed below, using a shortcut) even though the graphical element may not be selectable by an end-user.

The canvas 210 corresponds to a window within which graphical output of the end-user application is presented in order to permit the user/author to test and configure the end-user application. For example, if the end-user application is a web application, the canvas 210 may present a scrollable webpage containing text, images, and/or other content encoded in HTML (Hypertext Markup Language). As part of developing the end-user application, the user may choose to add a prompt to the content displayed within the canvas 210. That is, the user can configure a prompt to be displayed when the end-user application is executed at runtime. Further, as will be described in detail below, the user of the builder application may configure various aspects of a prompt, including size, text content, and position.

Figure 3:
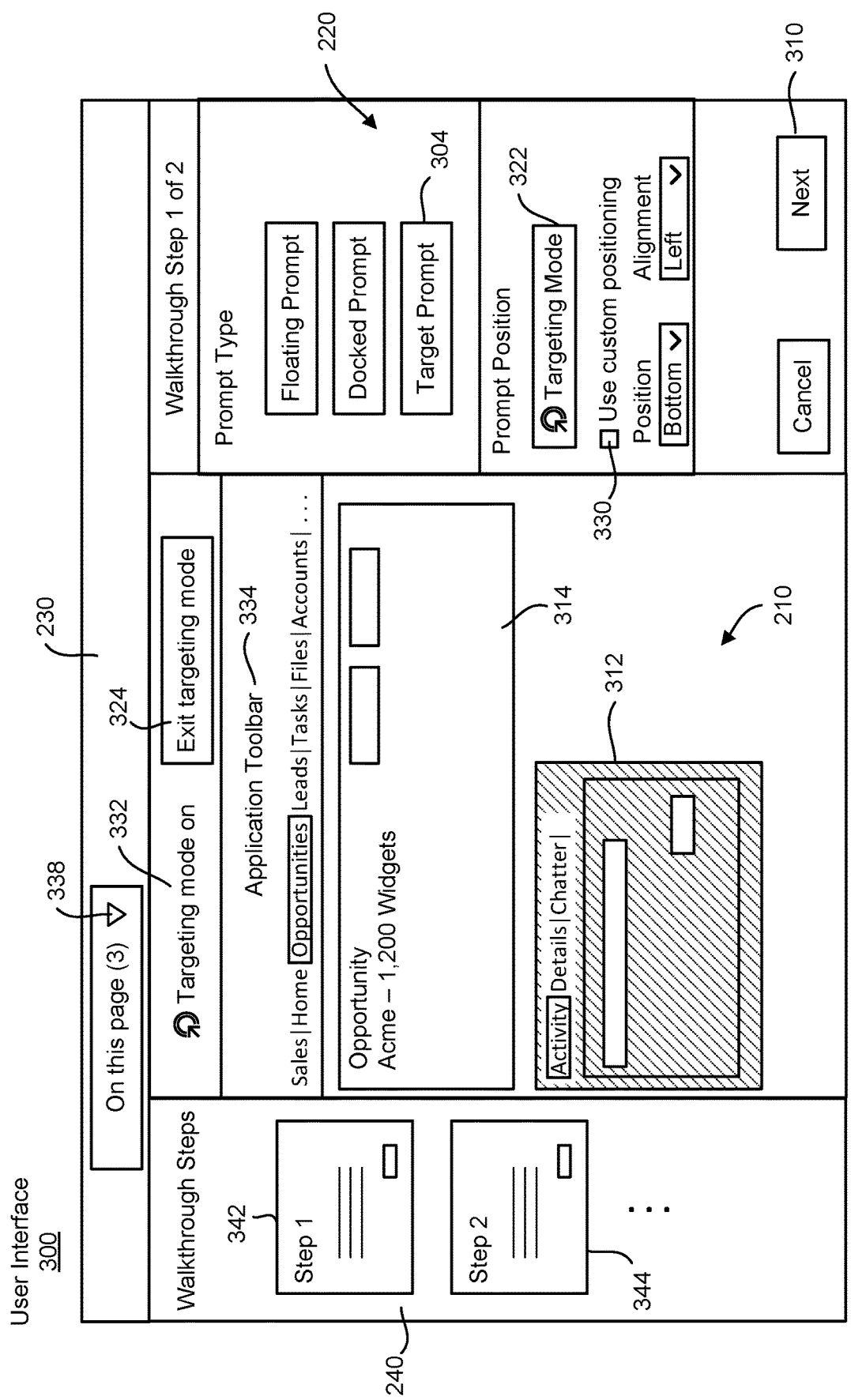
FIG. 3 shows an example implementation of the user interface in FIG. 2.

Configuration window 220 is configured to present options for configuring the end-user application. The options presented in the configuration window 220 can include options for creating and configuring prompts. In the example of FIG. 3, the configuration window 220 includes an option to select between different types of prompts: floating, docked, and targeted. Examples of these prompt types are described in connection with FIGS. 5 to 7.

Toolbar 230 may present options for navigating different menus available in the builder application. For instance, the toolbar 230 may include options to load a different end-user application, update the canvas 210 to switch to a different page of an end-user application, save existing progress, and exit the builder application.

Sidebar 240 may present additional options and/or present information relating to prompts. For instance, sidebar 240 may be configured to present, in the form of a slide deck, a preview of a walkthrough that includes a sequence of prompts. The sequence of prompts can include different types of prompts, such as a mix of targeted and floating prompts. Accordingly, the sidebar 240 may be used to navigate to individual prompts within the walkthrough by, for example, clicking on the corresponding preview slide.

As shown in FIG. 2, the canvas 210 may present a variety of graphical elements generated by the end-user application. Graphical elements can vary in size and shape but are often rectangular. Graphical elements can be interactive (e.g., a button or a window with a clickable link) or non-interactive (e.g., a window presenting an information table). Graphical elements can include targetable elements (e.g., targetable elements 202A and 202B) and non-targetable elements (e.g., non-targetable elements 204A and 204B). Targetable elements are graphical elements that can be validly associated with a target prompt. The builder application can be pre-configured with default rules on what types or categories of graphical elements are targetable and/or non-targetable, so that the builder application prevents the user from creating a targeted prompt for non-targetable elements. In some instances, the builder application may provide the user with the ability to specify what types of elements are targetable or non-targetable. The graphical elements can be arranged according to a user-configured page layout such as single column, double columns with uniform width, double columns with non-uniform width, and/or the like. In general, graphical elements may appear anywhere on the screen represented by the canvas 210. The graphical elements may span a page that is larger than the display area of the canvas 210, in which case the canvas 210 may be scrollable, and there may be instances where a graphical element may only be partially visible depending on the current scroll position.

FIG. 3 shows a UI 300 corresponding to an example implementation of the UI 200 in FIG. 2. In the example of FIG. 3, the user is configuring a walkthrough for the end-user application and has already created two prompts for the walkthrough, as indicated by preview slides 342 and 344 in the sidebar 240.

The canvas 210 of the UI 300 includes a message 332 above a toolbar 334 belonging to the UI of the end-user application. The message 332 indicates that a "targeting mode" has been turned on/activated. The targeting mode is an operating mode tailored toward creation of targeted prompts. The builder application may permit the user to create targeted prompts outside of the targeting mode, but the targeting mode provides a more accessible and user-friendly experience for visually impaired users. For instance, switching to the targeting mode may enable the use of keyboard shortcuts for performing certain actions without the aid of a mouse, trackball, stylus, touchpad, or other pointing device. The UI 300 may include an option to turn on the targeting mode, for instance, a button 322 in the configuration window 220. The button 322 for turning on the targeting mode can be enabled (e.g., made clickable) in response to the user selecting an option indicating targeted prompts as the prompt type, e.g., a button 304 in the configuration window 220. Similarly, the UI 300 may include an option to exit/turn off the targeting mode, e.g., a button 324 next to the message 332 in the toolbar 230. Other ways to exit the targeting mode may include selecting the button 322 again (the button 322 may act as a toggle switch for the targeting mode) or selecting a prompt type other than targeted prompt.

Additionally, the toolbar 230 may include a page number or provide other contextual information to indicate the current execution state of the end-user application. For example, FIG. 3 shows that the currently displayed contents of the canvas 210 correspond to page 3 of a set of pages presentable within the UI of the end-user application. The page number indicator can be presented together with an option to switch to another page, e.g., an option 338 that triggers a dropdown list of available pages.

The canvas 210 of the UI 300 may further include one or more graphical elements generated by the end-user application. In the example shown, such graphical elements include a first element 312 and a second element 314, which may be displayed in response to user selection of a corresponding option in the toolbar 334. For instance, the elements 312 and

314 may relate to sales or business opportunities and can be displayed based on user selection of an "Opportunities" option in the toolbar 334. The elements 312 and 314 can each include text and/or images, as well as interactive elements such as buttons, additional menus, radio buttons, etc.

FIG. 4 shows an example list of keyboard shortcuts that may be available through a builder application, according to some implementations. Some or all of the keyboard shortcuts shown in FIG. 4 may be exclusively available in the targeting mode. That is, the builder application may disregard user input of one or more keyboard shortcuts when the input is provided outside of the targeting mode. FIG. 4 is merely an example. Additional shortcuts or a different set of shortcuts may be available in some implementations, for example, a shortcut to undo a change to a prompt or other action, redo an action, save a change, etc. A keyboard shortcut can involve a combination of keys, as shown in FIG. 4, or a single key. In some implementations, keyboard shortcuts can be user-customized, e.g., remapped through a key binding procedure to a different key combination or to a single hotkey. The keyboard shortcuts can include global shortcuts that can be activated from anywhere within the UI of the builder application, as well as canvas-specific shortcuts that can be used to perform actions when the canvas region is selected.

An example of a global shortcut is a shortcut that opens a help menu with a complete list of keyboard shortcuts and help articles explaining how to use the keyboard shortcuts. In FIG. 4, the keyboard help shortcut (referred to herein as "Shortcut0") involves activating the Shift key simultaneously with forward slash: Shift+/. The help menu can be read out loud by a screen reader to inform the user about what keyboard shortcuts are available.

Another example of a global shortcut is a shortcut ("Shortcut1") to switch the visual focus (or simply, focus) of the UI to the canvas region (e.g., Command+F6 or, equivalently, Windows key+F6). In general, the UI of the builder application only has one region that is active or selected at any given time. The active region is the focus of the UI and may be highlighted or otherwise rendered in a manner that visually distinguishes the active region from other regions of the UI. Accordingly, when switching the focus from a first region (e.g., the configuration window 220) to the canvas, the UI could be updated to stop highlighting the first region and to highlight the canvas instead.

An individual element within a region can also be a focus. For example, to indicate a currently selected graphical element, the UI may highlight or draw a border around the currently selected graphical element. This is shown in FIG. 3, where the element 212 is shaded to indicate that the element 212 is the currently selected element. When a graphical element or region within the UI of the builder application is a focus, the user may interact with the focus, for example, by clicking a button displayed in the graphical element or region. The user may also interact with other graphical elements or regions, for example, by clicking on another region to switch the focus to the other region. Some user actions may only be validly performed on the graphical element or region that is the current focus/selected. For example, the builder application may be configured to disallow user interaction with the end-user application unless the focus is the canvas.

Keyboard shortcuts may be provided to facilitate navigation between the canvas and the rest of the UI. For instance, a shortcut may be provided for switching focus from the canvas to the builder application. In some implementations, the configuration window 220, the toolbar 230, the sidebar 240, and any regions other than the canvas may collectively be treated as a single, focusable region. In FIG. 4, this shortcut ("Shortcut2") is Command+F7. Together with Shortcut1, Shortcut2 would enable the user to immediately jump between the canvas and the builder application. This would avoid more cumbersome navigation methods that could be difficult for a visually impaired user, such as moving a mouse cursor to another region (after visually locating the other region) and then clicking on the other region using a mouse.

Similarly, keyboard shortcuts may be provided to facilitate navigation between graphical elements displayed in the canvas. For instance, the keyboard shortcuts can include a shortcut ("Shortcut3") to select the next element in the canvas (e.g., Command+Option (or Alt)+t) and a shortcut ("Shortcut4") to select the previous element in the canvas (e.g., Command+Option (or Alt)+Shift+t). Shortcut-based navigation can be based on an order in which graphical elements are arranged for display. For example, elements that are closer to the left and/or top of the canvas may appear earlier in the sequence, and elements closer to the right and/or bottom of the canvas may appear later in the sequence. However, the sequential order does not necessarily have to be tied to display order. In some instances, activating a shortcut to select the next or previous element may cause the canvas to scroll because the next or previous element is off-screen or only partially on-screen.

In some implementations, shortcut-based navigation between graphical elements in the canvas is restricted to targetable elements, that is, graphical elements that can be validly associated with targeted prompts. Thus, inputting Shortcut3 might cause the next targetable element in a sequence of targetable elements to become the currently selected element. To distinguish targetable elements from non-targetable elements, the builder application may be configured to highlight all targetable elements displayed on the canvas, e.g., by drawing a border around each targetable element in response to a switch to the targeting mode. Further, the builder application may apply a different highlight or visual effect (e.g., shading) to indicate which of the targetable elements is the current selected element. Restricting shortcut-based navigation to targetable elements provides a convenient way for the user to discover what graphical elements a targeted prompt can be created for and also enables the user to navigate to such elements without having to visually scan or scroll the canvas.

The keyboard shortcuts can also include a shortcut ("Shortcut5") to add a targeted prompt to the currently selected element (e.g., Command+Option (or Alt)+a), thereby creating a new targeted prompt and, at the same time, creating an association between the currently selected element and the new targeted prompt. To assist the user in creating a targeted prompt, the builder application may communicate with a screen reader so that an announcement is presented when the user has navigated to or selected a targetable element. The announcement may, for example, include an audio effect to inform the user that the currently selected element is targetable and/or an audio message explaining that Shortcut5 can be used in connection with the currently selected element.

When a targeted prompt is added, the builder application may update the canvas to display the new targeted prompt next to the currently selected element. As discussed below, the builder application may automatically determine the position of the targeted prompt. The position of the targeted prompt can also be customized through user input. For instance, the UI of the builder application may include an option to adjust the position of the targeted prompt after the targeted prompt has been placed in a default or initial position determined by the builder application. Accordingly, the user can associate a targeted prompt with a graphical element using only keyboard input. For instance, the user could navigate to a desired graphical element using the shortcuts described above for selecting the next/previous element in the canvas and, once the desired graphical element has been selected, cause a targeted prompt to be created for the desired graphical element without having to switch focus away from the canvas and without the aid of a pointing device.

FIG. 4 is merely an example of possible keyboard shortcuts that are available for use within the builder application. Other keyboard shortcuts that can be made available within the builder application include a shortcut to navigate between internal elements within a graphical element on the canvas, e.g., "Shortcut6" for navigating to the next internal element and "Shortcut7" for navigating to the previous internal element. Internal elements may correspond to links, tabs, buttons, input fields, or other elements that are accessible within higher-level container elements. The elements 212 and 214 in FIG. 3 are examples of such container elements since each of the elements 212, 214 includes sub-elements, represented in the figure as boxes.

Accordingly, a user of the builder application could use Shortcut3 and/or Shortcut4 to cycle between container elements (e.g., elements corresponding to different sections of a page displayed in the canvas), skipping the internal elements within the container elements. This would avoid having to navigate through all the elements on the canvas, including internal elements. Once the desired container element is reached, the user could create a targeted prompt for the desired (currently selected) container element, e.g., using Shortcut5. Alternatively, the UI of the builder application could include a selectable option to create a targeted prompt for the currently selected element, e.g., a button 310 within the configuration window 220, as shown in FIG. 3. To create a targeted prompt for an internal element, the user could use Shortcut6 and/or Shortcut7 to cycle between the internal elements of the currently selected container element and to quickly arrive at an internal element for which a targeted prompt is to be created. A targeted prompt created for an internal element may be logically associated with the internal element but, when displayed, may point to either the internal element or a container element within which the internal element resides.

Another keyboard shortcut ("Shortcut8") may jump directly into the most recent targeted prompt. In many instances, the most recent targeted prompt is the last targeted prompt to be displayed on the canvas. For example, the most recent targeted prompt could be a prompt that was placed onto the canvas in response to user input of Shortcut5, but which has not yet been fully configured. Once the targeted prompt has been selected using Shortcut8, the user could navigate the internal elements of the targeted prompt (e.g., using Shortcut6 and/or Shortcut7) to reach an internal element that relates to some configurable aspect of the targeted prompt. For example, the internal element could be a text field for configuring a message to an end-user. Alternatively, the internal element could be a drag icon (shown in FIG. 8) that, when selected, permits repositioning of the targeted prompt through a separate keyboard shortcut (e.g., Spacebar+an arrow key). In this manner, the user may position the targeted prompt without relying on input from a pointing device.

Figure 5:
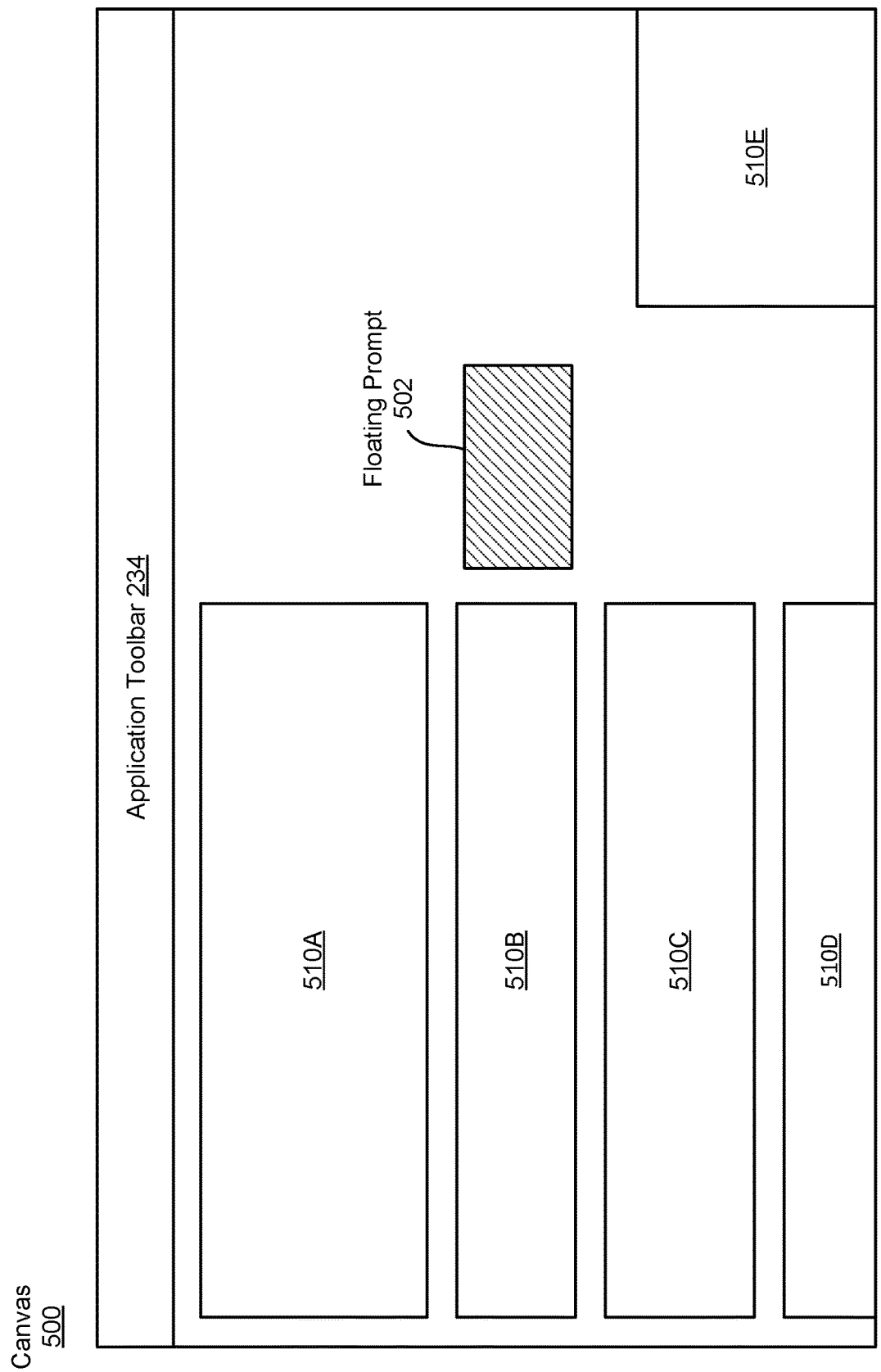
FIG. 5 shows an example of a floating prompt.

FIG. 5 shows an example of a floating prompt 502 displayed together with a set of graphical elements 510A to 510E within a canvas 500. The size and shape of a prompt may be fixed. For example, the builder application may be preconfigured to generate prompts that are substantially rectangular in shape (e.g., rectangles with rounded corners) and of fixed dimensions. The dimensions of a prompt (e.g., length and width) can be specified in terms of pixels or other standard units such inches, centimeters, and/or the like. In some implementations, the size and/or shape of a prompt is manually adjustable and/or automatically adjusted by the builder application. For instance, the builder application may be configured with a list of shapes for each prompt type and an initial size for each shape. The builder application may permit the user to resize a prompt before or after the prompt is placed onto the canvas. Alternatively, the builder application could automatically resize or select a different shape of prompt to better match the size and/or shape of one or more surrounding graphical elements (e.g., elements 510A to 510E).

As shown in FIG. 5, the floating prompt 502 appears unconnected to any of the elements 510A to 510E. However, floating prompts (and prompts in general) can be stacked on top of other graphical elements. The floating prompt 502 is "floating" in that the position of the floating prompt 502 is not tied to any other graphical elements on the canvas 500. A canvas may include multiple layers of graphical elements, where the layers are displayed in a certain order. Accordingly, the floating prompt 502 can be placed in a layer that is displayed after a layer containing the elements 510A to 501E, so that the floating prompt 502 would cover a graphical element 510 if the floating prompt 502 was placed in a position where the floating prompt overlapped the graphical element 510. The extent to which the floating prompt 502 obscures the overlapped element may be user-adjustable, for example, through varying the transparency of the floating prompt.

Figure 6:
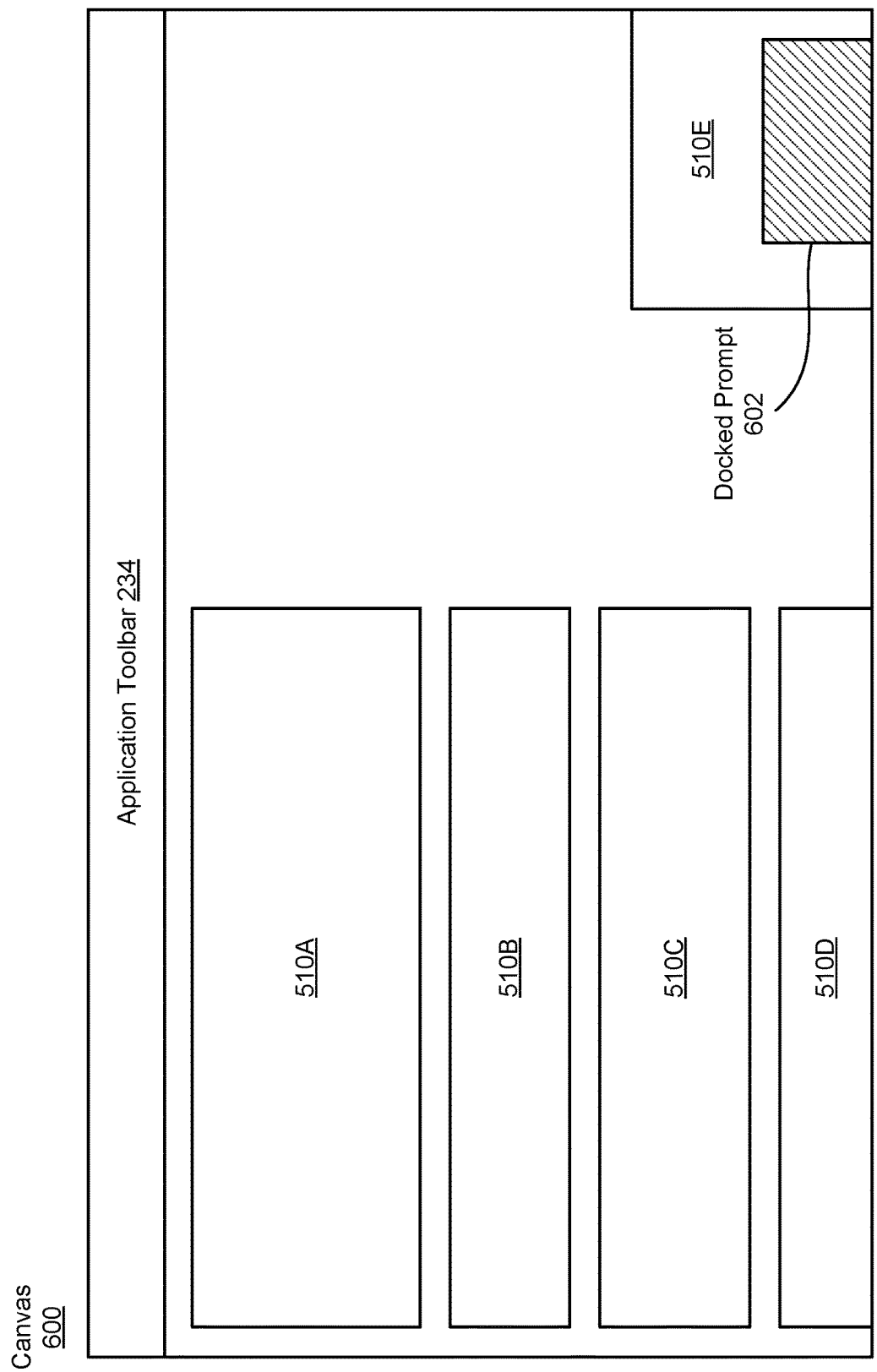
FIG. 6 shows an example of a docked prompt.

FIG. 6 shows an example of a docked prompt 602 displayed within a canvas 600 together with the graphical elements 510A to 510E from FIG. 5. The functionality described above with respect to the floating prompt 502, including adjustability of size, shape, position, and other aspects of the prompt, can also apply to the docked prompt 602. The docked prompt 602 is shown as being docked near the lower right corner of the canvas 600. In particular, the bottom edge of the docked prompt 602 coincides with the bottom edge of the canvas 600, and the right edge of the docked prompt 602 is slightly spaced apart from the right edge of the canvas 600. Other docking positions are also possible. For example, the docked prompt 602 could be moved horizontally while remaining tied to the bottom edge of the canvas 600. Other corners and/or edges of the canvas 600 may also serve as docking locations. As discussed above, prompts can be placed such that they overlap (partially or completely) with other graphical elements. FIG. 6 shows an example of such overlap. In FIG. 6, the docked prompt 602 is smaller than the graphical element 510E and is placed on top of the graphical element 510E so that a portion of the graphical element 510E is obscured by the docked prompt 602.

Figure 7:
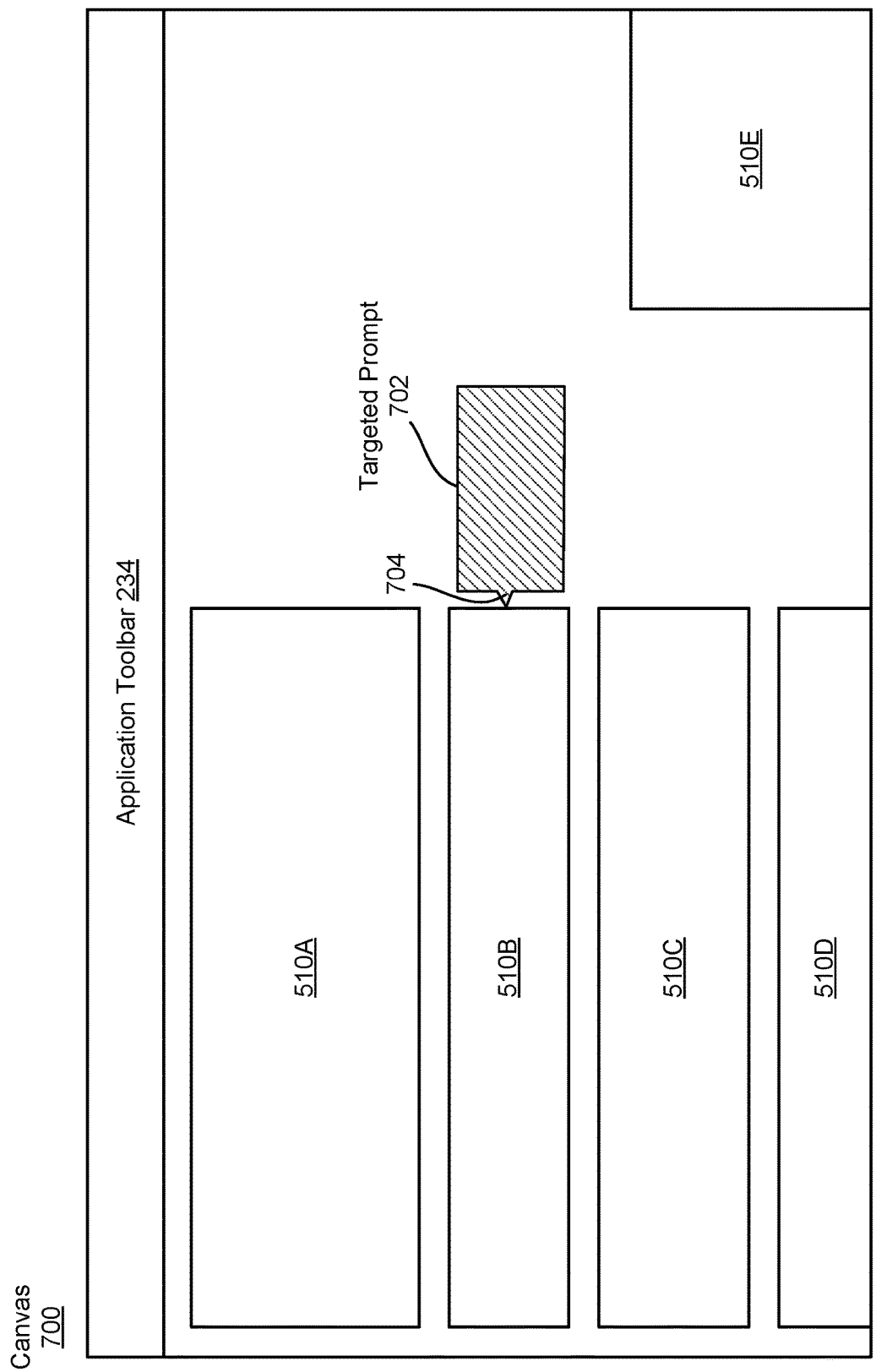
FIG. 7 shows an example of a targeted prompt.

FIG. 7 shows an example of a targeted prompt 702 displayed within a canvas 700 together with the graphical elements 510A to 510E from FIG. 5. The functionality described above with respect to the floating prompt 502, including adjustability of size, shape, position, and other aspects of the prompt, can also apply to the targeted prompt 702. As shown in FIG. 7, the targeted prompt 702 can include a protrusion 704 or other feature that extends toward the graphical element with which the targeted prompt 702 is associated (in this example, element 510B). The feature that extends toward the associated graphical element may or may not contact the graphical element. Accordingly, although the protrusion 704 is shown as extending to meet the right side of the element 510B, the protrusion 704 could be spaced apart from the element 510B while still pointing to the element 510B.

Targeted prompts are usually displayed near (e.g., adjacent to) their associated elements. For instance, the targeted prompt 702 may be placed in the general vicinity of the element 510B and such that the protrusion 704 extends toward the nearest side of the element 510B. In some implementations, the builder application is configured to perform "smart" positioning of a prompt through determining an optimal position based on how the graphical elements are arranged on the canvas. For a targeted prompt, the optimal position may be a position that enables the targeted prompt to be as close as possible to its associated element while minimizing any overlap between the targeted prompt and a graphical element. The optimal position for the targeted prompt 702 may be on the right side of the element 510B, as shown in FIG. 7, since there is insufficient room to place the targeted prompt 702 along the other sides of the element 510B without overlapping another graphical element or going off-screen. Further, the optimal position for the targeted prompt 702 may be aligned to the center (midpoint) of the right side of the element 510B in order to optimize distances between the targeted prompt 702 and neighboring graphical elements such as the elements 510A, 510C, and 510E. Distance-based optimization can be based on achieving a minimum required distance with respect to all neighboring graphical elements, maximizing the average distance across all neighboring graphical elements, and/or other distance criteria.

Referring back to FIG. 3, the configuration window 220 may include an option for the user to specify the position of a targeted prompt. For instance, upon entering the targeting mode (e.g., via pressing the button 322), the builder application may enable a checkbox 330. The user can check the checkbox 330 to indicate that custom positioning will be used. Alternatively, the user can leave the checkbox 330 unchecked so that the builder application decides the position of a targeted prompt based on the smart positioning described above. If the user decides to use custom positioning, the configuration window 220 can be updated to enable further options for configuring position, e.g., dropdown menus to indicate that the targeted prompt should be positioned along a particular side (e.g., bottom) of the associated graphical element and an alignment (e.g., left-aligned) with respect to the particular side of the graphical element, as shown in FIG. 3.

As discussed above, prompts can include text and/or images. In some implementations, the contents of a prompt can be modified through user input applied to the prompt as displayed on the canvas 210. For instance, the prompt may include an input field for receiving text. Other aspects of a prompt may also be configurable and can include, for example, the color of the prompt based on a one-time color setting or based on a preconfigured or custom design theme. Some prompt configuration options may be available through non-canvas portions of the builder application. The position options presented in the configuration window 220 are one example. Prompt configuration options can be presented in the configuration window 220 itself, in a pop-up window, in a pull-down menu accessed via the toolbar 230, in the sidebar 240, or other locations in the UI of the builder application.

In some implementations, the builder application provides options to add visual effects to a targeted prompt and/or its associated element. For example, an option to highlight the associated element when the targeted prompt is displayed, by drawing a border around the associated element, and with the thickness and color of the border being customizable. Additional examples of visual effects include hiding the targeted prompt when hovering over the associated element, animations displayed in response to scrolling or interacting with internal elements of a targeted prompt, and a spotlight effect to provide the appearance that the targeted prompt is illuminating its associated element.

Figure 8:
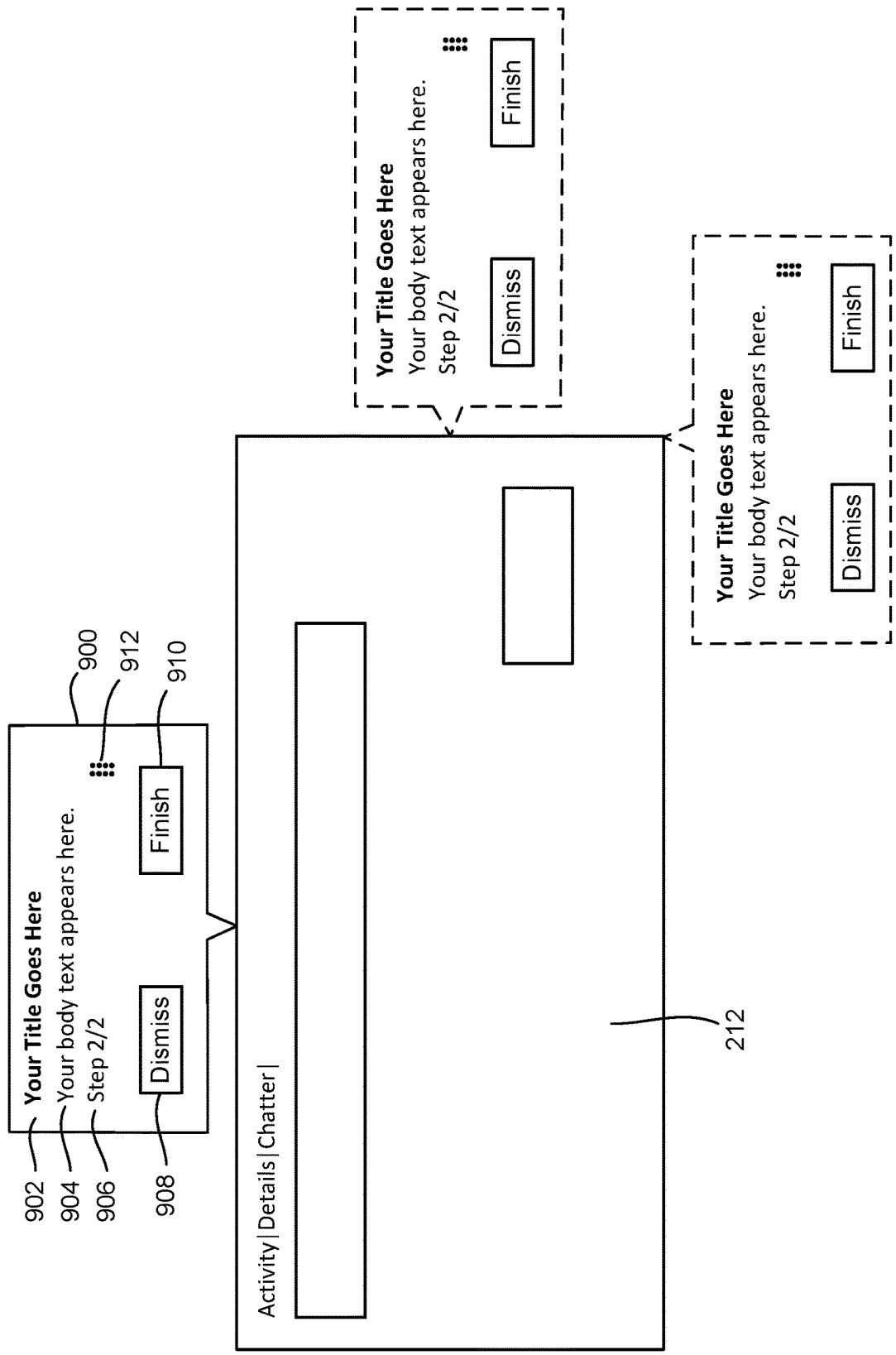
FIG. 8 shows an example of a targeted prompt and its associated graphical element.

FIG. 8 shows a targeted prompt 900 created for the graphical element 212 in FIG. 3. The targeted prompt 900 is shown in an incomplete state that may correspond to how a targeted prompt appears after it is placed onto the canvas, but before the targeted prompt has been fully configured by the user. The initial state of a targeted prompt may be based on a preconfigured template containing default text (e.g., "Your body text appears here") that will be replaced by user-supplied text. The targeted prompt 900 includes a title section 902 configured to display a title, a body section 904 configured to display a text message, and a status indicator 906 indicating progress through a sequence of prompts. In addition to the text displayed in the body section 904, the builder application may permit the user to configure a custom announcement to be presented by a screen reader when the targeted prompt 900 is displayed to an end-user at runtime.

Figure 9:
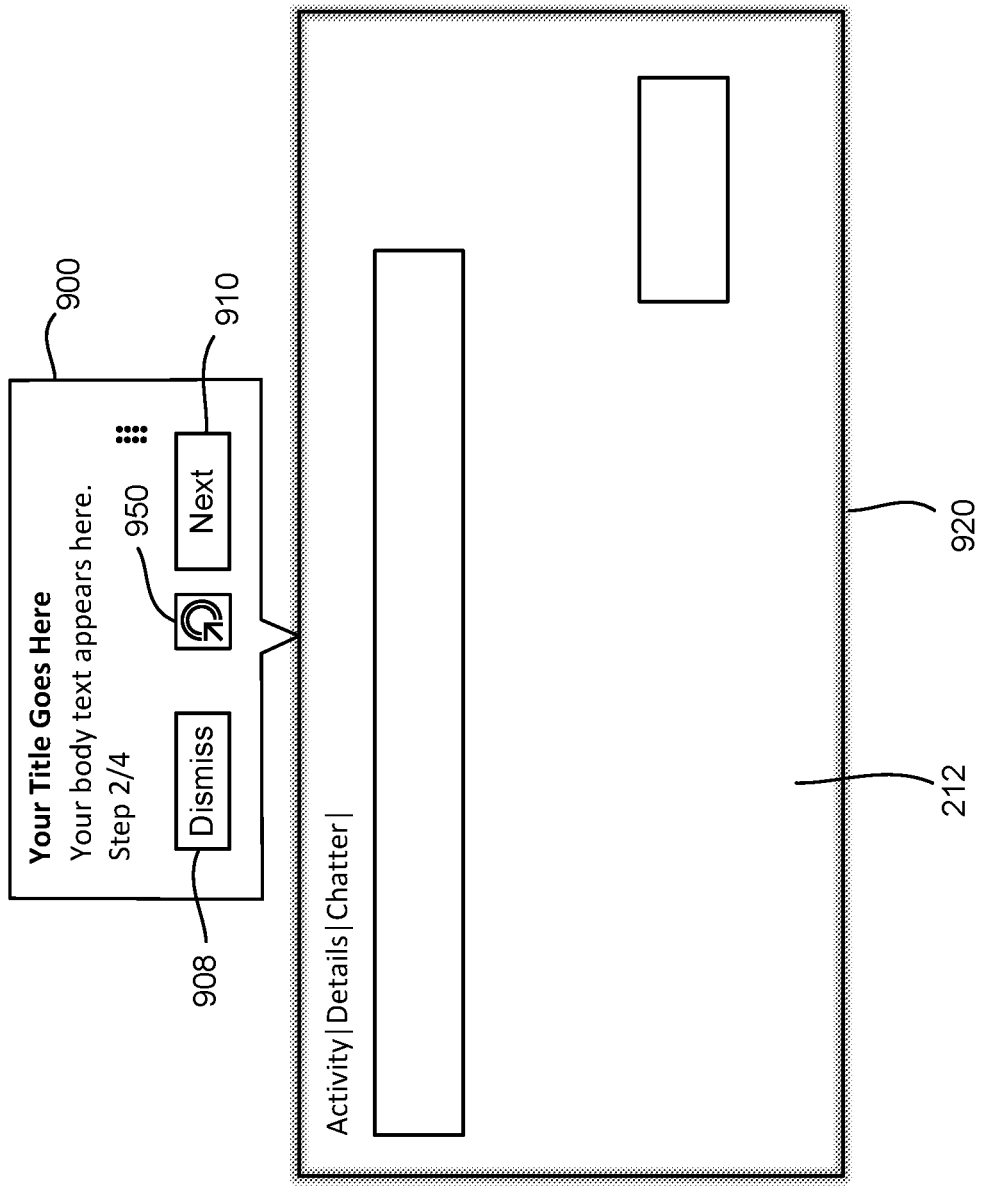
FIG. 9 shows the targeted prompt of FIG. 8 updated to include a button that can be used to switch focus to the element associated with the targeted prompt, according to some implementations.

The targeted prompt 900 further includes an option 908 to dismiss the targeted prompt 900 (e.g., close permanently, or snooze for 20 minutes, 1 hour, until a specific time and date, etc.) and an option 910 to proceed to the next step. In the example of FIG. 8, the option 910 is shown as a "finish" button since the targeted prompt 900 corresponds to the last step in a two-step walkthrough. If additional prompts followed the targeted prompt 900, the option 910 could instead be a "next" button that advances to the next prompt, as shown in FIG. 9.

FIG. 8 also shows some alternative locations for the targeted prompt 900. As shown, the targeted prompt 900 could be aligned to the center of the right side of the element 212 (similar to FIG. 7) or aligned to the right of the bottom side of the element 212. As described above, prompts can be positioned manually or through automated positioning, and manual positioning can be performed without the aid of a point device. For instance, the targeted prompt 900 may include a drag icon 912 (shown as a group of dots) that could be selected through a point-and-click operation but could also be selected through a keyboard-based method such as: jumping into the targeted prompt 900 via Shortcut8, navigating to the drag icon 912 using Shortcut6, and then using another shortcut to reposition the targeted prompt 900 (e.g., Space+left arrow to move the targeted prompt 900 to the left).

While working on the end-user application, a user of the builder application may perform an action that breaks the association between a graphical element and its corresponding targeted prompt, for instance, renaming, deleting, or moving the graphical element to a different file folder. The association can also be broken due to the graphical element no longer being available for reasons not attributed to the user. The builder application may be configured to detect when the association between a graphical element and a targeted prompt has become broken and may, in response, display a warning message requesting the user to update the association, for example, through selecting another graphical element for association with the targeted prompt. The builder application may display a similar warning when the user navigates to different page of the end-user application (causing a new set of graphical elements to be displayed on the canvas) before completing the configuration of a targeted prompt.

In some implementations, the builder application may permit to the user to change prompt types while working on a prompt. When the prompt type is changed, the builder application may retain configuration information for the prompt and transfer the configuration information to the new prompt. For instance, if the user changes from a targeted prompt to a floating prompt, the builder application can replace the targeted prompt on the canvas with a floating prompt containing the same text or other informational fields that were configured for the targeted prompt. The floating prompt can be in a different location on the canvas, and the builder application may save the location of the targeted prompt in case the user decides to revert back to a targeted prompt before saving or finalizing the configuration of the floating prompt. Further, when the initial prompt is not a targeted prompt and the user switches to targeted prompt as the prompt type, the builder application may display a message informing the user that the prompt should be associated with a graphical element.

The above discussion of keyboard shortcuts primarily relates to functionality provided through a builder application. In some implementations, keyboard shortcuts are available for use by an end-user during runtime execution of the application that is developed through the builder application. Support for runtime shortcuts can be provided through configuration of the end-user application. Such configuration may involve manual programming or automated configuration performed by the computer system executing the builder application (e.g., computer system 110). Shortcuts that are available at runtime may also be available during the build phase since a user of the builder application can, through the UI of the builder application, interact with the end-user application in a similar manner to an end-user at runtime. Accordingly, runtime shortcuts can be considered to be a subset of the shortcuts that are available during the build phase. The above-described shortcut for jumping directly into a targeted prompt (Shortcut8) is an example of a shortcut that could be used at runtime.

During runtime, the UI generated by the end-user application may have a similar appearance as when presented in the canvas of the builder application. However, there may be some differences in appearance due to manual configuration by the end-user and/or attributes of the end-user's computer system. For instance, the arrangement of graphical elements and which graphical elements are visible on-screen may depend on the screen resolution of a display monitor in the user system 120B. The end-user application may also adjust prompt position through the same smart positioning available to the builder application.

Accordingly, at runtime, the end-user application may place a prompt in a position different from that specified by a user of the builder application. For example, if a prompt was configured by an author to be in a position that is offscreen for the end-user, covering the element it is associated with, or covering a different element, the end-user application may reposition the prompt so that it is onscreen and does not cover any elements. The end-user can also manually reposition prompts, e.g., by dragging on the prompt using their mouse or through a keyboard shortcut (e.g., Shift+an arrow key). When a targeted prompt is manually repositioned, the element it is associated with may remain highlighted or otherwise marked/called out so that the user can continue to know what the targeted prompt was pointing to. Similarly, the end-user application may permit an end-user to reposition the pointer portion of a targeted prompt (e.g., protrusion 704 in FIG. 7).

FIG. 9 shows the targeted prompt 900 updated to include a button 950. The button 950 can be used (e.g., by an end-user) to switch focus to or select the element associated with the targeted prompt (e.g., the element 212). Button 950 can be hidden until the targeted prompt 900 is selected (e.g., using Shortcut8). In some implementations, the button 950 may remain hidden until the user has navigated to the last internal element within the targeted prompt. If the end-user application is executed in conjunction with a screen reader, the screen reader may announce the targeted prompt 900 and its associated element when the targeted prompt 900 is initially displayed. The screen reader may also generate speech or other output informing the user about a keyboard shortcut (e.g., Shortcut8) that can be used to select/focus on the targeted prompt 900. When the targeted prompt 900 is initially displayed, the end-user application may avoid switching focus to the targeted prompt 900, since doing so could interrupt a user interaction. For instance, the user could be typing in an input field displayed on another region of the page at the time that the targeted prompt 900 appears on-screen. Instead of interrupting the user by jumping immediately to the targeted prompt 900 or the element associated with the targeted prompt 900, the end-user application may permit the user to switch to the targeted prompt 900 and its associated element at a later time, e.g., through Shortcut8 and button 950. Once the targeted prompt 900 has been selected, the application may update the targeted prompt to show the button 950, enabling the user to switch from the targeted prompt 900 to the associated element.

Clicking or otherwise activating the button 950 (e.g., pressing the Enter key when the button 950 is selected) shifts the focus to the associated element. For example, clicking the button 950 may cause a border 920 of the element 212 to become highlighted. In some implementations, a first visual effect is applied to the associated element when a targeted prompt is initially displayed at runtime (e.g., highlighting of the border 920), then a second visual effect is applied to indicate selection of the associated element (e.g., shading in response to pressing the button 950). Highlighting or other visual effects can be configured through the builder application (e.g., in the configuration window 220 or some other portion of the UI) and can be applied to set the element 212 visually apart from other displayed elements. Other visual effects can be applied to set graphical elements apart, for example, a blinking dot or other animation placed onto the associated element near the pointer portion of the targeted prompt. The button 950 can help the user quickly determine what element the targeted prompt 900 is associated with and is useful for situations where a visually impaired user might find it difficult to discern where the targeted prompt is pointing.

Once inside the element associated with the targeted prompt, the user can navigate the element using their keyboard, e.g., using Shortcut6 and Shortcut7 described above. Additionally, a separate shortcut ("Shortcut9") may be used to navigate from the targeted prompt to its associated element, as an alternative to using the button 950. Shortcut9 may also be used to navigate from the associated element back to the targeted prompt. Thus, the user can navigate within the associated element or perform some action that the targeted prompt requests the user to perform with respect to the associated element. After completing the requested action, the user can use Shortcut9 to navigate back to the targeted prompt to close/dismiss the targeted prompt (e.g., using option 908) or to proceed to the next prompt in the sequence (e.g., using option 910).

The following is a list of some of the keyboard shortcuts described above. This list is merely an example of shortcuts that can be used to make configuring and accessing targeted prompts more user accessible. Depending on implementation, the shortcuts available during execution of a builder application or end-user application may include more, fewer, or different shortcuts that those listed.

Shortcut0—Launch keyboard help.
Shortcut1—Switch focus to/select the canvas.
Shortcut2—Switch focus to/select the builder application.
Shortcut3—Select the next element in the canvas (can be restricted to targetable elements).
Shortcut4—Select the previous element in the canvas (can be restricted to targetable elements).
Shortcut5—Add a targeted prompt to the currently selected element in the canvas.
Shortcut6—Select the next internal element within the currently selected container element (can be used to navigate within a prompt or a graphical element other than a prompt).
Shortcut7—Select the previous internal element within the currently selected container element (can be used to navigate within a prompt or a graphical element other than a prompt).
Shortcut8—Jump directly to the most recent targeted prompt (e.g., a targeted prompt being configured for the currently selected element).
Shortcut9—Switch between a targeted prompt and its associated element.

Figure 10:
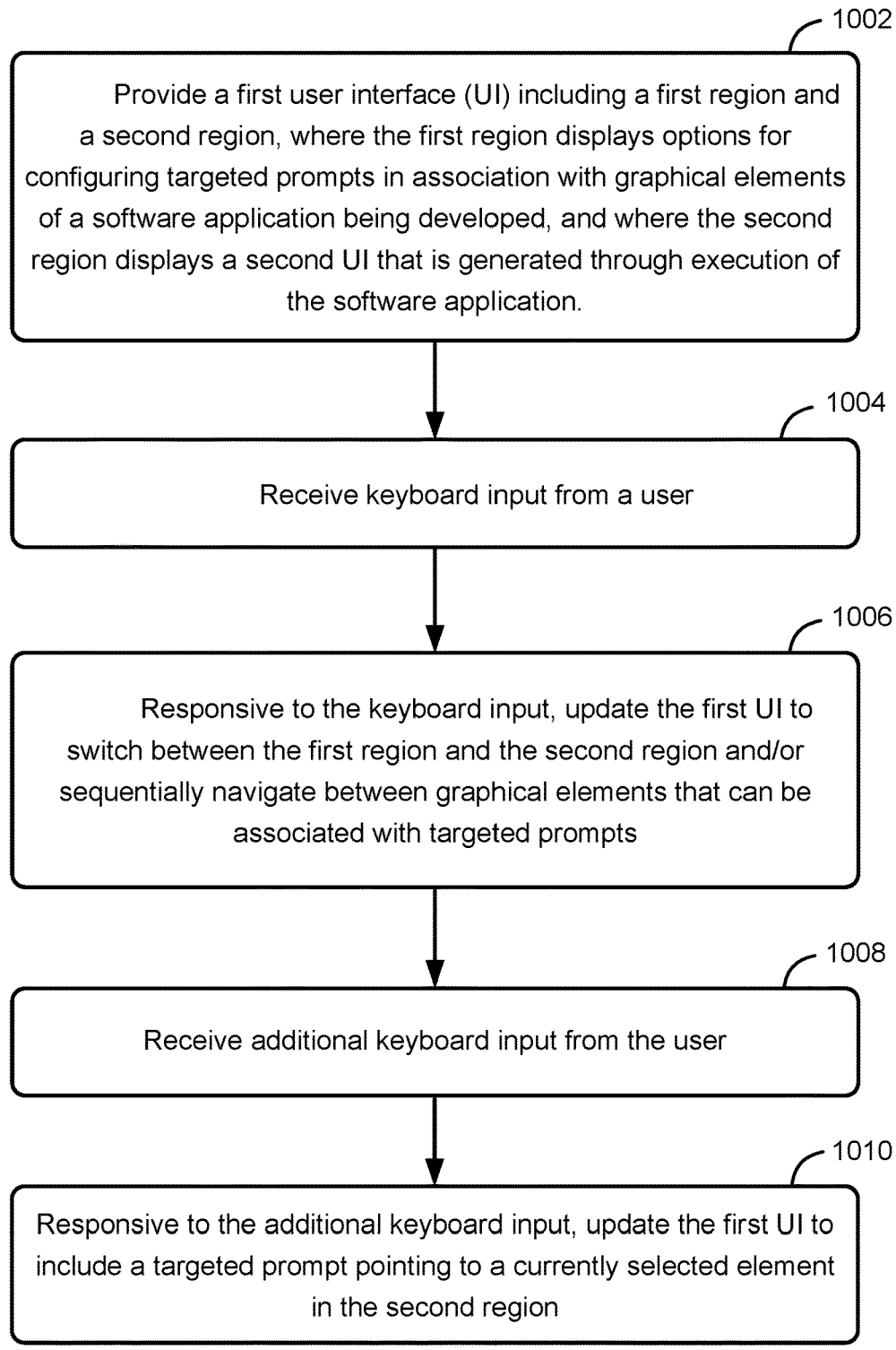
FIG. 10 shows a flow diagram of a process for configuring a targeted prompt through keyboard-based interaction with a builder application, according to some implementations.

FIG. 10 shows a flow diagram of a process 1000 for configuring a targeted prompt through keyboard-based interaction with a builder application, according to some implementations. The process 1000 can be performed by one or more processors of a computer system configured to execute a builder application (e.g., computer system 110 and/or user system 120A in FIG. 1).

At 1002, the builder application provides a first UI (e.g., UI 200 or UI 300) for display to a user. The first UI may include a first region (e.g., configuration window 220) that displays options for configuring targeted prompts in association with graphical elements of a software application being developed (e.g., end-user application 116). The first UI may further include a second region (e.g., canvas 210) that displays a second UI generated through execution of the software application being developed.

At 1004, keyboard input is received from the user. The keyboard input may include one or more keyboard shortcuts and is processed by the builder application to update the first UI in block 1006, discussed below.

At 1006, the builder application updates the first UI in response to the keyboard input received in block 1004. The updating of the first UI may involve switching between the first region and the second region (e.g., based on Shortcut1 or Shortcut2). Alternatively, the updating of the first UI may involve sequentially navigating between graphical elements, where the graphical elements include (and are possibly restricted to) graphical elements that can be associated with targeted prompts (e.g., based on Shortcut3 or Shortcut4).

At 1008, additional keyboard input is received from the user. Like the keyboard input in block 1004, the additional keyboard input may include one or more keyboard shortcuts that are processed by the builder application to update the first UI.

At 1010, the builder application further updates the first UI in response to the additional keyboard input received in 1008. The updating in block 1010 may involve, for example, adding a targeted prompt in the second region, where the targeted prompt points to a currently selected element in the second region (e.g., based on Shortcut5). After the targeted prompt has been added, the builder application may permit the user to configure the targeted prompt to add text, reposition the targeted prompt, or perform some other prompt-related configuration described above. Once the targeted prompt has been fully configured, the user can create additional prompts, which may include additional targeted prompts added based on repeating some or all of the steps in blocks 1004 to 1010.

Figure 11:
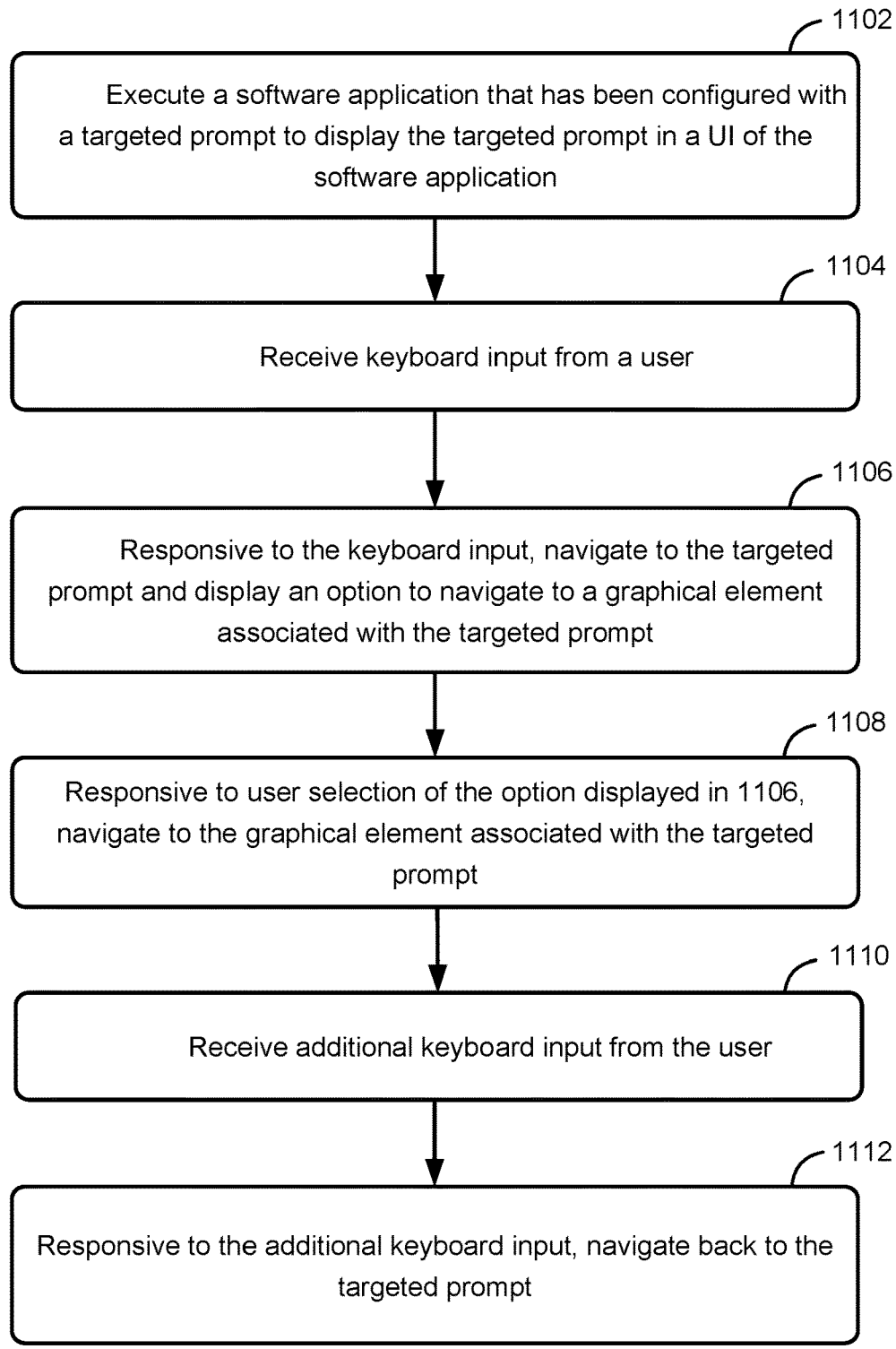
FIG. 11 shows a flow diagram of a process for accessing a targeted prompt and its associated graphical element through keyboard-based interaction at runtime, according to some implementations.

FIG. 11 shows a flow diagram of a process 1100 for accessing a targeted prompt and its associated graphical element through keyboard-based interaction at runtime, according to some implementations. The process 1100 can be performed by one or more processors of a computer system configured to execute a software application, where the software application has been configured with one or more targeted prompts (e.g., computer system 110 and/or user system 120B in FIG. 1).

At 1102, the computer system executes the software application (e.g., end-user application 116). At some point during execution, the software application displays a targeted prompt in a UI of the software application (e.g., the second UI discussed in connection with block 1002 of FIG. 10). As described above, the trigger condition for a targeted prompt can be based on a user action (e.g., the user requests in-application guidance) or based on an event (e.g., an incoming email). The targeted prompt is associated with a graphical element that is displayed together with the targeted prompt in the UI.

At 1104, keyboard input is received from the user. The keyboard input may include one or more keyboard shortcuts and is processed by the software application to update the UI in block 1106, discussed below. In particular, the keyboard input in block 1104 can include a keyboard shortcut that causes the targeted prompt to be selected (e.g., Shortcut8).

At 1106, the software application updates the UI in response to the keyboard input received in block 1004. The updating of the UI may involve navigating to the targeted prompt, for example, by switching away from a region of the UI that the user was interacting with at the time that the targeted prompt became displayed. Navigating to the targeted prompt may permit the user to interact with one or more internal elements of the targeted prompt and cause the previous user interaction to be terminated. For example, if the user was previously typing into a text field elsewhere in the UI, switching to the targeted prompt may disable input to the text field and permit the user to type into a separate text field within the targeted prompt.

In addition to navigating to the targeted prompt, the software application displays an option to navigate to the graphical element associated with the targeted prompt. This option can be displayed within the targeted prompt and may, for example, correspond to the button 950 in FIG. 9. If displayed within the targeted prompt, the option may be one of the internal elements of the targeted prompt that the user can interact with. For example, the user may cycle through the internal elements to reach the option using Shortcut6 or Shortcut7.

At 1108, the software application navigates to the associated element in response to user selection of the option displayed in block 1106 (e.g., clicking or activating the button 950). Alternatively, the user could input a keyboard shortcut (e.g., Shortcut9) to navigate to the associated element. Navigating to the associated element may permit the user to interact with one or more internal elements of the associated element and cause any user interaction with the targeted prompt to be terminated.

At 1110, additional keyboard input is received from the user. The additional keyboard input may include a keyboard shortcut (e.g., Shortcut9) to navigate back to the targeted prompt. The user may supply the additional keyboard input after interacting with the associated element, for example, to perform an action requested by the targeted prompt. In some implementations, the option displayed in block 1106 may be used to return to the targeted prompt. For example, the button 950 may toggle between the targeted prompt and the associated element.

At 1112, the software application navigates back to the targeted prompt in response to the additional keyboard input received in block 1110. Navigating back to the targeted prompt may permit the user to resume interacting with the targeted prompt, for example, by clicking or activating a button that causes the targeted prompt to be dismissed or moves on to the next prompt in a sequence including the targeted prompt.

Figure 12A:
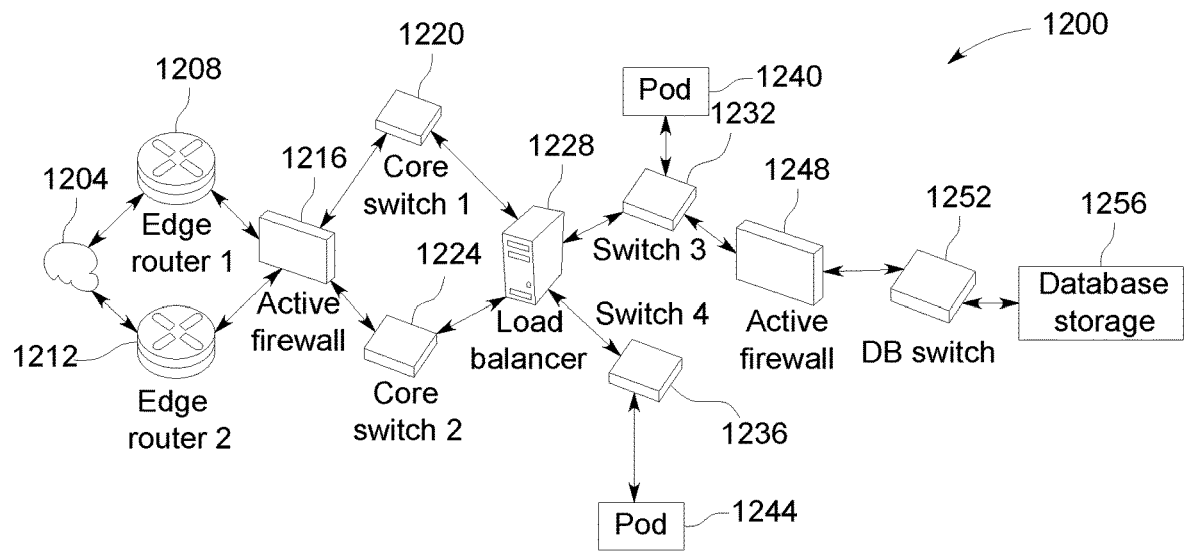
FIG. 12A shows a system diagram illustrating architectural components of an applicable environment, in accordance with some implementations.

FIG. 12A shows a system diagram illustrating architectural components of an on-demand service environment 1200, in accordance with some implementations. For instance, the on-demand service environment 1200 may correspond to an implementation of computing environment 100 in FIG. 1. A client machine located in the cloud 1204 (or Internet) may communicate with the on-demand service environment via one or more edge routers 1208 and 1212. The edge routers may communicate with one or more core switches 1220 and 1224 via firewall 1216. The core switches may communicate with a load balancer 1228, which may distribute server load over different pods, such as pods 1240 and 1244. The pods 1240 and 1244, which may each include one or more servers and/or other computing resources, may perform data processing and other operations used to provide on-demand services. Communication with the pods may be conducted via pod switches 1232 and 1236. Components of the on-demand service environment may communicate with a database storage system 1256 via a database firewall 1248 and a database switch 1252.

Figure 12B:
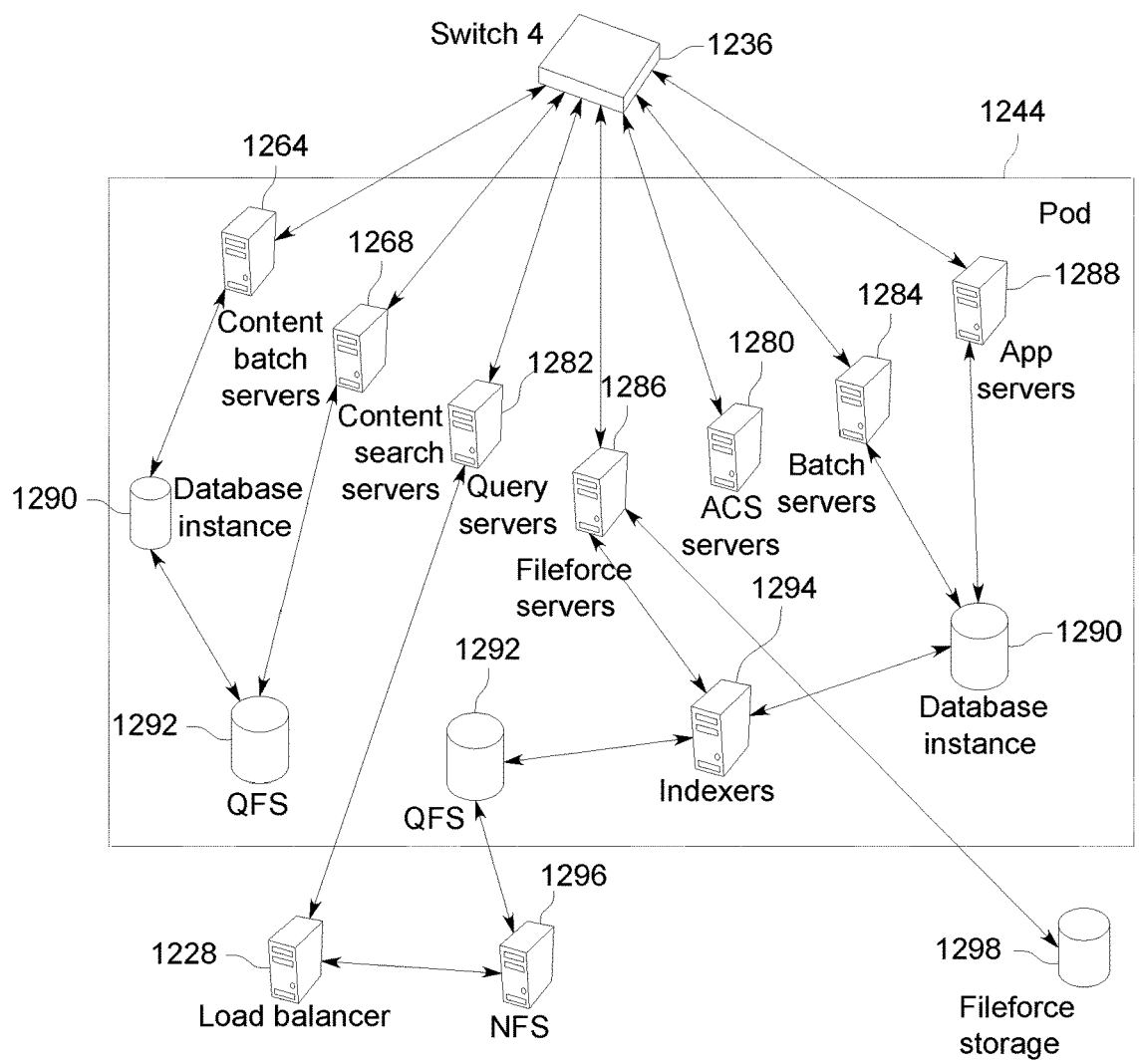
FIG. 12B shows a system diagram further illustrating architectural components of an applicable environment, in accordance with some implementations.

As shown in FIGS. 12A and 12B, accessing an on-demand service environment may involve communications transmitted among a variety of different hardware and/or software components. Further, the on-demand service environment 1200 is a simplified representation of an actual on-demand service environment. For example, while only one or two devices of each type are shown in FIGS. 12A and 12B, some implementations of an on-demand service environment may include anywhere from one to many devices of each type. Also, the on-demand service environment need not include each device shown in FIGS. 12A and 12B or may include additional devices not shown in FIGS. 12A and 12B.

Moreover, one or more of the devices in the on-demand service environment 1200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 1204 is intended to refer to a data network or plurality of data networks, often including the Internet. Client machines located in the cloud 1204 may communicate with the on-demand service environment to access services provided by the on-demand service environment. For example, client machines may access the on-demand service environment to retrieve, store, edit, and/or process information.

In some implementations, the edge routers 1208 and 1212 route packets between the cloud 1204 and other components of the on-demand service environment 1200. The edge routers 1208 and 1212 may employ the Border Gateway Protocol (BGP). The BGP is the core routing protocol of the Internet. The edge routers 1208 and 1212 may maintain a table of IP networks or 'prefixes' which designate network reachability among autonomous systems on the Internet.

In one or more implementations, the firewall 1216 may protect the inner components of the on-demand service environment 1200 from Internet traffic. The firewall 1216 may block, permit, or deny access to the inner components of the on-demand service environment 1200 based upon a set of rules and other criteria. The firewall 1216 may act as one or more of a packet filter, an application gateway, a stateful filter, a proxy server, or any other type of firewall.

In some implementations, the core switches 1220 and 1224 are high-capacity switches that transfer packets within the on-demand service environment 1200. The core switches 1220 and 1224 may be configured as network bridges that quickly route data between different components within the on-demand service environment. In some implementations, the use of two or more core switches 1220 and 1224 may provide redundancy and/or reduced latency.

In some implementations, the pods 1240 and 1244 may perform the core data processing and service functions provided by the on-demand service environment. Each pod may include various types of hardware and/or software computing resources. An example of the pod architecture is discussed in greater detail with reference to FIG. 12B.

In some implementations, communication between the pods 1240 and 1244 may be conducted via the pod switches 1232 and 1236. The pod switches 1232 and 1236 may facilitate communication between the pods 1240 and 1244 and client machines located in the cloud 1204, for example via core switches 1220 and 1224. Also, the pod switches 1232 and 1236 may facilitate communication between the pods 1240 and 1244 and the database storage 1256.

In some implementations, the load balancer 1228 may distribute workload between the pods 1240 and 1244. Balancing the on-demand service requests between the pods may assist in improving the use of resources, increasing throughput, reducing response times, and/or reducing overhead. The load balancer 1228 may include multilayer switches to analyze and forward traffic.

In some implementations, access to the database storage 1256 may be guarded by a database firewall 1248. The database firewall 1248 may act as a computer application firewall operating at the database application layer of a protocol stack. The database firewall 1248 may protect the database storage 1256 from application attacks such as structure query language (SQL) injection, database rootkits, and unauthorized information disclosure.

In some implementations, the database firewall 1248 may include a host using one or more forms of reverse proxy services to proxy traffic before passing it to a gateway router.

The database firewall 1248 may inspect the contents of database traffic and block certain content or database requests. The database firewall 1248 may work on the SQL application level atop the TCP/IP stack, managing applications' connection to the database or SQL management interfaces as well as intercepting and enforcing packets traveling to or from a database network or application interface.

In some implementations, communication with the database storage system 1256 may be conducted via the database switch 1252. The multi-tenant database system 1256 may include more than one hardware and/or software components for handling database queries. Accordingly, the database switch 1252 may direct database queries transmitted by other components of the on-demand service environment (e.g., the pods 1240 and 1244) to the correct components within the database storage system 1256. In some implementations, the database storage system 1256 is an on-demand database system shared by many different organizations. The on-demand database system may employ a multi-tenant approach, a virtualized approach, or any other type of database approach. An on-demand database system is discussed in greater detail with reference to FIGS. 13 and 14.

FIG. 12B shows a system diagram illustrating the architecture of the pod 1244, in accordance with one implementation. The pod 1244 may be used to render services to a user of the on-demand service environment 1200. In some implementations, each pod may include a variety of servers and/or other systems. The pod 1244 includes one or more content batch servers 1264, content search servers 1268, query servers 1282, Fileforce servers 1286, access control system (ACS) servers 1280, batch servers 1284, and app servers 1288. Also, the pod 1244 includes database instances 1290, quick file systems (QFS) 1292, and indexers 1294. In one or more implementations, some or all communication between the servers in the pod 1244 may be transmitted via the switch 1236.

In some implementations, the application servers 1288 may include a hardware and/or software framework dedicated to the execution of procedures (e.g., programs, routines, scripts) for supporting the construction of applications provided by the on-demand service environment 1200 via the pod 1244. Some such procedures may include operations for providing the services described herein. The content batch servers 1264 may handle requests internal to the pod. These requests may be long-running and/or not tied to a particular customer. For example, the content batch servers 1264 may handle requests related to log mining, cleanup work, and maintenance tasks.

The content search servers 1268 may provide query and indexer functions. For example, the functions provided by the content search servers 1268 may allow users to search through content stored in the on-demand service environment. The Fileforce servers 1286 may manage requests for information stored in the Fileforce storage 1298. The Fileforce storage 1298 may store information such as documents, images, and basic large objects (BLOBs). By managing requests for information using the Fileforce servers 1286, the image footprint on the database may be reduced.

The query servers 1282 may be used to retrieve information from one or more file systems. For example, the query servers 1282 may receive requests for information from the app servers 1288 and then transmit information queries to network file systems (NFS) 1296 located outside the pod. The pod 1244 may share a database instance 1290 configured as a multi-tenant environment in which different organizations share access to the same database. Additionally, services rendered by the pod 1244 may require various hardware and/or software resources. In some implementations, the ACS servers 1280 may control access to data, hardware resources, or software resources.

In some implementations, the batch servers 1284 may process batch jobs, which are used to run tasks at specified times. Thus, the batch servers 1284 may transmit instructions to other servers, such as the app servers 1288, to trigger the batch jobs. For some implementations, the QFS 1292 may be an open source file system available from Sun Microsystems® of Santa Clara, California. The QFS may serve as a rapid-access file system for storing and accessing information available within the pod 1244. The QFS 1292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 1268 and/or indexers 1294 to identify, retrieve, move, and/or update data stored in the NFS 1296 and/or other storage systems.

In some implementations, one or more query servers 1282 may communicate with the NFS 1296 to retrieve and/or update information stored outside of the pod 1244. The NFS 1296 may allow servers located in the pod 1244 to access information to access files over a network in a manner similar to how local storage is accessed. In some implementations, queries from the query servers 1282 may be transmitted to the NFS 1296 via the load balancer 1228, which may distribute resource requests over various resources available in the on-demand service environment. The NFS 1296 may also communicate with the QFS 1292 to update the information stored on the NFS 1296 and/or to provide information to the QFS 1292 for use by servers located within the pod 1244.

In some implementations, the pod may include one or more database instances 1290. The database instance 1290 may transmit information to the QFS 1292. When information is transmitted to the QFS, it may be available for use by servers within the pod 1244 without requiring an additional database call. In some implementations, database information may be transmitted to the indexer 1294. Indexer 1294 may provide an index of information available in the database 1290 and/or QFS 1292. The index information may be provided to Fileforce servers 1286 and/or the QFS 1292.

Figure 13:
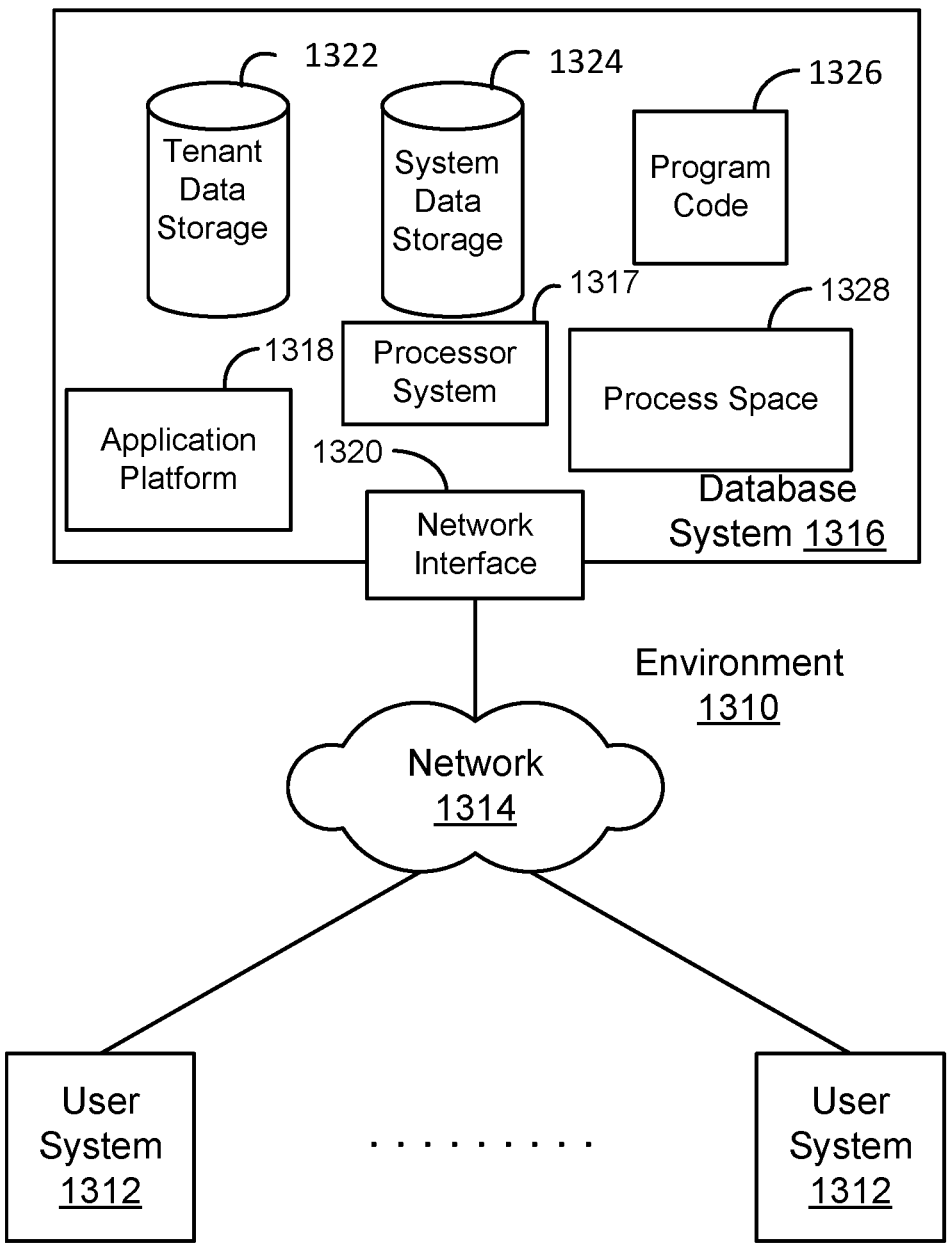
FIG. 13 shows a system diagram illustrating the architecture of a multi-tenant database environment, in accordance with some implementations.
Figure 14:
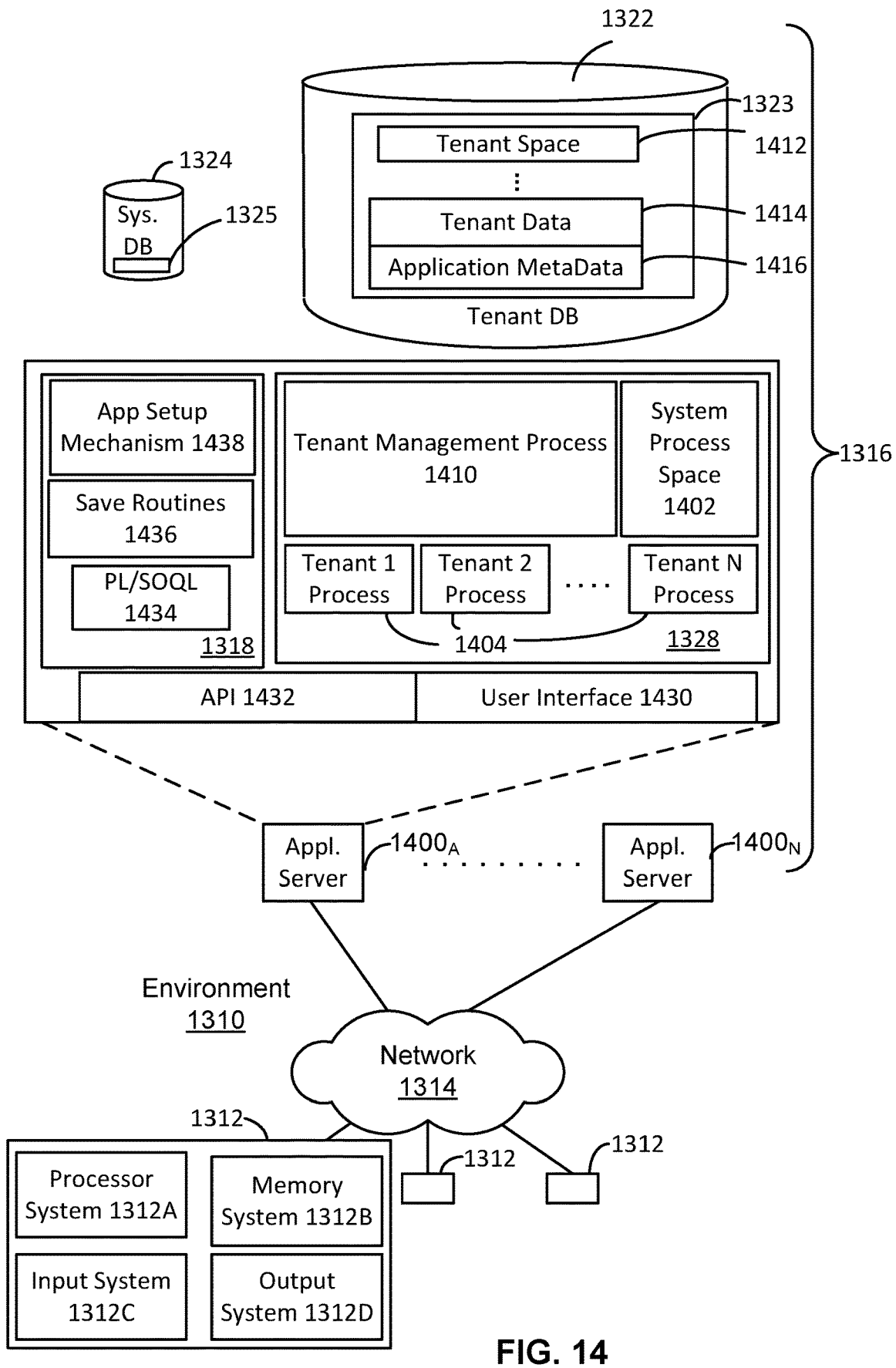
FIG. 14 shows a system diagram further illustrating the architecture of a multi-tenant database environment, in accordance with some implementations.

FIG. 13 shows a block diagram of an environment 1310 wherein an on-demand database service might be used, in accordance with some implementations. Environment 1310 includes an on-demand database service 1316. User system 1312 may be any machine or system that is used by a user to access a database user system. For example, any of user systems 1312 can be a handheld computing system, a mobile phone, a laptop computer, a workstation, and/or a network of computing systems. As illustrated in FIGS. 13 and 14, user systems 1312 might interact via a network 1314 with the on-demand database service 1316.

An on-demand database service, such as system 1316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 1316" and "system 1316" will be used interchangeably herein. A database image may include one or more database objects. A relational database management system (RDBMS) or the equivalent may execute storage and retrieval of information against the database object(s). Application platform 1318 may be a framework that allows the applications of system 1316 to run, such as the hardware and/or software, e.g., the operating system. In an implementation, on-demand database service 1316 may include an application platform 1318 that enables creation, managing and executing one or more applications developed by the provider of the on-demand database service, users accessing the on-demand database service via user systems 1312, or third party application developers accessing the on-demand database service via user systems 1312.

One arrangement for elements of system 1316 is shown in FIG. 13, including a network interface 1320, application platform 1318, tenant data storage 1322 for tenant data 1323, system data storage 1324 for system data 1325 accessible to system 1316 and possibly multiple tenants, program code 1326 for implementing various functions of system 1316, and a process space 1328 for executing MTS system processes and tenant-specific processes, such as running applications as part of an application hosting service. Additional processes that may execute on system 1316 include database indexing processes.

The users of user systems 1312 may differ in their respective capacities, and the capacity of a particular user system 1312 might be entirely determined by permissions (permission levels) for the current user. For example, where a call center agent is using a particular user system 1312 to interact with system 1316, the user system 1312 has the capacities allotted to that call center agent. However, while an administrator is using that user system to interact with system 1316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 1314 is any network or combination of networks of devices that communicate with one another. For example, network 1314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 1312 might communicate with system 1316 using TCP/IP and, at a higher network level, use other common Internet protocols to communicate, such as HTTP, FTP, AFS, WAP, etc. In an example where HTTP is used, user system 1312 might include an HTTP client commonly referred to as a "browser" for sending and receiving HTTP messages to and from an HTTP server at system 1316. Such an HTTP server might be implemented as the sole network interface between system 1316 and network 1314, but other techniques might be used as well or instead. In some implementations, the interface between system 1316 and network 1314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some implementations, system 1316, shown in FIG. 13, implements a web-based customer relationship management (CRM) system. For example, in some implementations, system 1316 includes application servers configured to implement and execute CRM software applications as well as provide related data, code, forms, webpages and other information to and from user systems 1312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 1316 implements applications other than, or in addition to, a CRM application. For example, system 1316 may provide tenant access to multiple hosted (standard and custom) applications. User (or third party developer) applications, which may or may not include CRM, may be supported by the application platform 1318, which manages creation, storage of the applications into one or more database objects and executing of the applications in a virtual machine in the process space of the system 1316.

Each user system 1312 could include a desktop personal computer, workstation, laptop, PDA, cell phone, or any wireless access protocol (WAP) enabled device or any other computing system capable of interfacing directly or indirectly to the Internet or other network connection. User system 1312 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 1312 to access, process and view information, pages and applications available to it from system 1316 over network 1314.

Each user system 1312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 1316 or other systems or servers. For example, the user interface device can be used to access data and applications hosted by system 1316, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some implementations, each user system 1312 and all of its components are operator configurable using applications, such as a browser, including computer code run using a central processing unit such as an Intel Pentium® processor or the like. Similarly, system 1316 (and additional instances of an MTS, where more than one is present) and all of their components might be operator configurable using application(s) including computer code to run using a central processing unit such as processor system 1317, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 1316 to intercommunicate and to process webpages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for carrying out disclosed operations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some implementations, each system 1316 is configured to provide webpages, forms, applications, data and media content to user (client) systems 1312 to support the access by user systems 1312 as tenants of system 1316. As such, system 1316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 14 also shows a block diagram of environment 1310 further illustrating system 1316 and various interconnections, in accordance with some implementations. FIG. 14 shows that user system 1312 may include processor system 1312A, memory system 1312B, input system 1312C, and output system 1312D. FIG. 14 shows network 1314 and system 1316. FIG. 14 also shows that system 1316 may include tenant data storage 1322, tenant data 1323, system data storage 1324, system data 1325, User Interface (UI) 1430, Application Program Interface (API) 1432, PL/SOQL 1434, save routines 1436, application setup mechanism 1438, applications servers 1400A-1400N, system process space 1402, tenant process spaces 1404, tenant management process space 1410, tenant storage area 1412, user storage 1414, and application metadata 1416. In other implementations, environment 1310 may not have the same elements as those listed above and/or may have other elements instead of, or in addition to, those listed above.

User system 1312, network 1314, system 1316, tenant data storage 1322, and system data storage 1324 were discussed above in FIG. 13. Regarding user system 1312, processor system 1312A may be any combination of processors. Memory system 1312B may be any combination of one or more memory devices, short term, and/or long term memory. Input system 1312C may be any combination of input devices, such as keyboards, mice, trackballs, scanners, cameras, and/or interfaces to networks. Output system 1312D may be any combination of output devices, such as monitors, printers, and/or interfaces to networks. As shown by FIG. 14, system 1316 may include a network interface 1320 (of FIG. 13) implemented as a set of HTTP application servers 1400, an application platform 1318, tenant data storage 1322, and system data storage 1324. Also shown is system process space 1402, including individual tenant process spaces 1404 and a tenant management process space 1410. Each application server 1400 may be configured to tenant data storage 1322 and the tenant data 1323 therein, and system data storage 1324 and the system data 1325 therein to serve requests of user systems 1312. The tenant data 1323 might be divided into individual tenant storage areas 1412, which can be either a physical arrangement and/or a logical arrangement of data. Within each tenant storage area 1412, user storage 1414 and application metadata 1416 might be similarly allocated for each user. For example, a copy of a user's most recently used (MRU) items might be stored to user storage 1414. Similarly, a copy of MRU items for an entire organization that is a tenant might be stored to tenant storage area 1412. A UI 1430 provides a user interface and an API 1432 provides an application programmer interface to system 1316 resident processes to users and/or developers at user systems 1312. The tenant data and the system data may be stored in various databases, such as Oracle™ databases.

Application platform 1318 includes an application setup mechanism 1438 that supports application developers' creation and management of applications, which may be saved as metadata into tenant data storage 1322 by save routines 1436 for execution by subscribers as tenant process spaces 1404 managed by tenant management process 1410 for example. Invocations to such applications may be coded using PL/SOQL 1434 that provides a programming language style interface extension to API 1432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1416 for the subscriber making the invocation and executing the metadata as an application in a virtual machine.

Each application server 1400 may be communicably coupled to database systems, e.g., having access to system data 1325 and tenant data 1323, via a different network connection. For example, one application server 1400 might be coupled via the network 1314 (e.g., the Internet), another application server 1400 might be coupled via a direct network link, and another application server 1400 might be coupled by yet a different network connection. Transfer Control Protocol and Internet Protocol (TCP/IP) are typical protocols for communicating between application servers 1400 and the database system. However, other transport protocols may be used to optimize the system depending on the network interconnect used.

In certain implementations, each application server 1400 is configured to handle requests for any user associated with any organization that is a tenant. Because it is desirable to be able to add and remove application servers from the server pool at any time for any reason, there is preferably no server affinity for a user and/or organization to a specific application server 1400. In some implementations, therefore, an interface system implementing a load balancing function (e.g., an F5 Big-IP load balancer) is communicably coupled between the application servers 1400 and the user systems 1312 to distribute requests to the application servers 1400. In some implementations, the load balancer uses a least connections algorithm to route user requests to the application servers 1400. Other examples of load balancing algorithms, such as round robin and observed response time, also can be used. For example, in certain implementations, three consecutive requests from the same user could hit three different application servers 1400, and three requests from different users could hit the same application server 1400. In this manner, system 1316 is multi-tenant, wherein system 1316 handles storage of, and access to, different objects, data and applications across disparate users and organizations.

As an example of storage, one tenant might be a company that employs a sales force where each call center agent uses system 1316 to manage their sales process. Thus, a user might maintain contact data, leads data, customer follow-up data, performance data, goals and progress data, etc., all applicable to that user's personal sales process (e.g., in tenant data storage 1322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1316 might also maintain system level data usable by multiple tenants or other data. Such system level data might include industry reports, news, postings, and the like that are sharable among tenants.

In certain implementations, user systems 1312 (which may be client machines/systems) communicate with application servers 1400 to request and update system-level and tenant-level data from system 1316 that may require sending one or more queries to tenant data storage 1322 and/or system data storage 1324. System 1316 (e.g., an application server 1400 in system 1316) automatically generates one or more SQL statements (e.g., SQL queries) that are designed to access the desired information. System data storage 1324 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein but should be defined only in accordance with the following and later-submitted claims and their equivalents.

What is claimed is:

1. A computer-implemented method comprising:
providing, by a computer system, a first user interface (UI) including a first region and a second region, wherein:
the first region is a configuration window generated through execution of a builder application and displays options for creating targeted prompts for a software application being developed and positioning the targeted prompts relative to graphical elements of the software application,
the second region is a canvas provided by the builder application,
the canvas displays a second UI generated through execution of the software application and permits a first user to interact with the software application while using the builder application to create the targeted prompts,
the configuration window and the canvas are displayed simultaneously during execution of the builder application, and
the software application can be executed independently of the builder application to display the targeted prompts and the graphical elements in the second UI without functionalities of the builder application;
activating a targeting mode of the builder application in response to selection of a first option by the first user, wherein the targeting mode makes one or more keyboard shortcuts the builder application is programmed to recognize available, the one or more keyboard shortcuts being unavailable through the software application and when the targeting mode is deactivated;
responsive to input from the first user after the targeting mode has been activated, updating the first UI to:
sequentially navigate, based on repeated input of a first keyboard shortcut of the one or more keyboard shortcuts and using functionality provided by the builder application with respect to the canvas, between targetable elements through selecting the targetable elements one element at a time while skipping non-targetable elements, wherein:
the targetable elements are graphical elements for which the builder application permits targeted prompts to be created and are distributed across one or more columns extending beyond a screen area of the canvas,
the builder application highlights or visually distinguishes the targetable elements from the non-targetable elements and a currently-selected targetable element from non-selected targetable elements, and
the builder application identifies the targetable elements as the first user adds, deletes, or rearranges graphical elements on the canvas, using preconfigured rules indicating categories of graphical elements that can be validly associated with a targeted prompt and such that an order in which the targetable elements are selected each time the first keyboard shortcut is input corresponds to an order in which the targetable elements are currently arranged for display;
detecting, by the builder application, a broken association involving a first targeted prompt on the canvas, the broken association resulting from a corresponding graphical element no longer being available; and
displaying, by the builder application, a message prompting the first user to update the broken association with respect to the first targeted prompt.

2. The computer-implemented method of claim 1, wherein the updating of the first UI includes switching an active region from the configuration window to the canvas, or vice versa, in response to user input of a second keyboard shortcut of the one or more keyboard shortcuts.

3. The computer-implemented method of claim 1, wherein the updating of the first UI includes switching from the currently-selected targetable element to a next or previous targetable element in response to the first keyboard shortcut.

4. The computer-implemented method of claim 3, wherein the first option is located in the first region.

5. The computer-implemented method of claim 3, wherein switching from the currently-selected targetable element to the next or previous targetable element includes highlighting or displaying a border around the next or previous targetable element.

6. The computer-implemented method of claim 1, further comprising:
associating, in response to user input of a second keyboard shortcut, a first targeted prompt with a first graphical element, wherein the first graphical element is a targetable element selected through sequential navigation based on the first keyboard shortcut;
determining, by the computer system, a position of the first targeted prompt relative to the first graphical element; and updating the second region to display the first targeted prompt in the position relative to the first graphical element.

7. The computer-implemented method of claim 6, wherein the position of the first targeted prompt is determined by the builder application based on minimizing overlap between the first targeted prompt and other graphical elements displayed together with the first graphical element in the second region.

8. The computer-implemented method of claim 6, further comprising:
displaying, in the first UI, an input field for associating text with the first targeted prompt, wherein the software application is configured to, when executed on a computing device of a second user, display the text within the first targeted prompt or communicate the text to a screen reader application.

9. The computer-implemented method of claim 1, further comprising:
configuring, by the builder application, the software application to display an option that is selectable, when a first graphical element is displayed together with a first targeted prompt associated with the first graphical element, to switch from the first targeted prompt to the first graphical element while keeping the first graphical element and the first targeted prompt displayed.

10. The computer-implemented method of claim 9, wherein the option that is selectable to switch from the first targeted prompt to the first graphical element is a button within the first targeted prompt, and wherein the button is hidden when the first targeted prompt is initially displayed.

11. A computer system comprising:
one or more processors; and
memory storing instructions that, when executed, cause the one or more processors to:
provide a first user interface (UI) including a first region and a second region, wherein:
the first region is a configuration window generated through execution of a builder application and displays options for creating targeted prompts for a software application being developed and positioning the targeted prompts relative to graphical elements of the software application,
the second region is a canvas provided by the builder application,
the canvas displays a second UI generated through execution of the software application and permits a first user to interact with the software application while using the builder application to create the targeted prompts,
the configuration window and the canvas are displayed simultaneously during execution of the builder application, and
the software application can be executed independently of the builder application to display the targeted prompts and the graphical elements in the second UI without functionalities of the builder application;
activate a targeting mode of the builder application in response to selection of a first option by the first user, wherein the targeting mode makes one or more keyboard shortcuts the builder application is programmed to recognize available, the one or more keyboard shortcuts being unavailable through the software application and when the targeting mode is deactivated;
responsive to input from the first user after the targeting mode has been activated, update the first UI to:
sequentially navigate, based on repeated input of a first keyboard shortcut of the one or more keyboard shortcuts and using functionality provided by the builder application with respect to the canvas, between targetable elements through selecting the targetable elements one element at a time while skipping non-targetable elements, wherein:
the targetable elements are graphical elements for which the builder application permits targeted prompts to be created and are distributed across one or more columns extending beyond a screen area of the canvas,
the builder application highlights or visually distinguishes the targetable elements from the non-targetable elements and a currently-selected targetable element from non-selected targetable elements, and
the builder application identifies the targetable elements as the first user adds, deletes, or rearranges graphical elements on the canvas, using preconfigured rules indicating categories of graphical elements that can be validly associated with a targeted prompt and such that an order in which the targetable elements are selected each time the first keyboard shortcut is input corresponds to an order in which the targetable elements are currently arranged for display;
detect, using the builder application, a broken association involving a first targeted prompt on the canvas, the broken association resulting from a corresponding graphical element no longer being available; and
display, using the builder application, a message prompting the first user to update the broken association with respect to the first targeted prompt.

12. The computer system of claim 11, wherein to update the first UI, the one or more processors are configured to switch an active region from the configuration window to the canvas, or vice versa, in response to user input of a second keyboard shortcut of the one or more keyboard shortcuts.

13. The computer system of claim 11, wherein to update the first UI, the one or more processors are configured to switch from the currently-selected graphical element to a next or previous targetable element in response to the first keyboard shortcut.

14. The computer system of claim 13, wherein the first option is located in the first region.

15. The computer system of claim 11, wherein the instructions further cause the one or more processors to:
associate, in response to user input of a second keyboard shortcut, a first targeted prompt with a first graphical element, wherein the first graphical element is a targetable element selected through sequential navigation based on the first keyboard shortcut;
determine a position of the first targeted prompt relative to the first graphical element; and
update the second region to display the first targeted prompt in the position relative to the first graphical element.

16. The computer system of claim 15, wherein the one or more processors are configured to determine, using the builder application, the position of the first targeted prompt based on minimizing overlap between the first targeted prompt and other graphical elements displayed together with the first graphical element in the second region.

17. The computer system of claim 15, wherein the instructions further cause the one or more processors to:
   display, in the first UI, an input field for associating text with the first targeted prompt, wherein the software application is configured to, when executed on a computing device of a second user, display the text within the first targeted prompt or communicate the text to a screen reader application.

18. The computer system of claim 11, wherein the instructions further cause the one or more processors to:
   configure, using the builder application, the software application to display an option that is selectable, when a first graphical element is displayed together with a first targeted prompt associated with the first graphical element, to switch from the first targeted prompt to the first graphical element while keeping the first graphical element and the first targeted prompt displayed.

19. The computer system of claim 18, wherein the option that is selectable to switch from the first targeted prompt to the first graphical element is a button within the first targeted prompt, and wherein the button is hidden when the first targeted prompt is initially displayed.

20. A non-transitory computer-readable medium storing program code, the program code including instructions that are executable by one or more processors of a computer system to:
   provide a first user interface (UI) including a first region and a second region, wherein:
      the first region is a configuration window generated through execution of a builder application and displays options for creating targeted prompts for a software application being developed and positioning the targeted prompts relative to graphical elements of the software application,
      the second region is a canvas provided by the builder application,
      the canvas displays a second UI that is generated through execution of the software application and permits a first user to interact with the software application while using the builder application to create the targeted prompts,
      the configuration window and the canvas are displayed simultaneously during execution of the builder application, and
      the software application can be executed independently of the builder application to display the targeted prompts and the graphical elements in the second UI without functionalities of the builder application;
   activate a targeting mode of the builder application in response to selection of a first option by the first user, wherein the targeting mode makes one or more keyboard shortcuts the builder application is programmed to recognize available, the one or more keyboard shortcuts being unavailable through the software application and when the targeting mode is deactivated;
   responsive to input from the first user after the targeting mode has been activated, update the first UI to:
      sequentially navigate, based on repeated input of a second first keyboard shortcut of the one or more keyboard shortcuts and using functionality provided by the builder application with respect to the canvas, between targetable elements through selecting the targetable elements one element at a time while skipping non-targetable elements, wherein:
         the targetable elements are graphical elements for which the builder application permits targeted prompts to be created and are distributed across one or more columns extending beyond a screen area of the canvas,
         the builder application highlights or visually distinguishes the targetable elements from the non-targetable elements and a currently-selected targetable element from non-selected targetable elements, and
         the builder application identifies the targetable elements as the first user adds, deletes, or rearranges graphical elements on the canvas, using preconfigured rules indicating categories of graphical elements that can be validly associated with a targeted prompt and such that an order in which the targetable elements are selected each time the first keyboard shortcut is input corresponds to an order in which the targetable elements are currently arranged for display;
   detect, using the builder application, a broken association involving a first targeted prompt on the canvas, the broken association resulting from a corresponding graphical element no longer being available; and
   display, using the builder application, a message prompting the first user to update the broken association with respect to the first targeted prompt.

* * * * *